United States Patent [19]
Takimoto et al.

[11] Patent Number: 5,120,038
[45] Date of Patent: Jun. 9, 1992

[54] AUTOMATIC DOCUMENT CONVEYING DEVICE FOR AN IMAGE PROCESSING MACHINE

[75] Inventors: Kazushi Takimoto, Kadoma; Yasushi Kamezaki, Sakai; Koji Maekawa, Kyoto; Kiyoshige Kameda, Higashi-Okasa; Hiroyuki Fujita, Sakai; Katsunori Masai, Amagasaki, all of Japan

[73] Assignee: Mita Industrial Co., Ltd., Osaka, Japan

[21] Appl. No.: 627,842

[22] Filed: Dec. 14, 1990

Related U.S. Application Data

[62] Division of Ser. No. 414,321, Sep. 29, 1989, Pat. No. 5,060,923.

[30] Foreign Application Priority Data

Oct. 4, 1988 [JP] Japan .................. 63-249114

[51] Int. Cl.⁵ ............................................. B65H 85/00
[52] U.S. Cl. .......................................... 271/3; 271/65; 271/186
[58] Field of Search ............. 271/3, 3.1, 4, 6, 7, 271/245, 65, 186; 355/320, 318

[56] References Cited

U.S. PATENT DOCUMENTS 4,627,709 12/1986 Kitajima et al. .................. 271/3 X
4,884,794 12/1989 Dinatale et al. .................. 271/3

FOREIGN PATENT DOCUMENTS 53-91747 8/1978 Japan.
60-118551 6/1985 Japan.
61-49348 4/1986 Japan.

*Primary Examiner*—David H. Bollinger
*Attorney, Agent, or Firm*—Antonelli, Terry, Stout & Kraus

[57] ABSTRACT

An automatic document conveying device for an image-processing machine including a housing having on its upper surface a transparent plate on which to place a document to be processed. This device comprises an opening-closing frame member mounted on the housing so that it is free to pivot about a pivot axis extending along the rear edge of the transparent plate between a closed position at which it covers the transparent plate and an open position at which it exposes the transparent plate to view; a stationary frame member to be mounted on the housing adjacent to the upstream end of the transparent plate; a document table disposed on the stationary frame member; a document sending unit for sending a plurality of sheet-like documents placed on the document table to a document carrying-in passage one by one; and a document carrying-in unit for introducing the sheet-like documents sent to the document carrying-in passage toward the transparent plate. A conveyor belt unit is disposed in the opening-closing frame member. The conveyor belt unit includes a unit frame mounted in the opening-closing frame member, a driven shaft a follower shaft mounted on the unit frame in spaced-apart relationship in the conveying direction, and an endless belt wrapped about the driven shaft and the follower shaft.

4 Claims, 17 Drawing Sheets

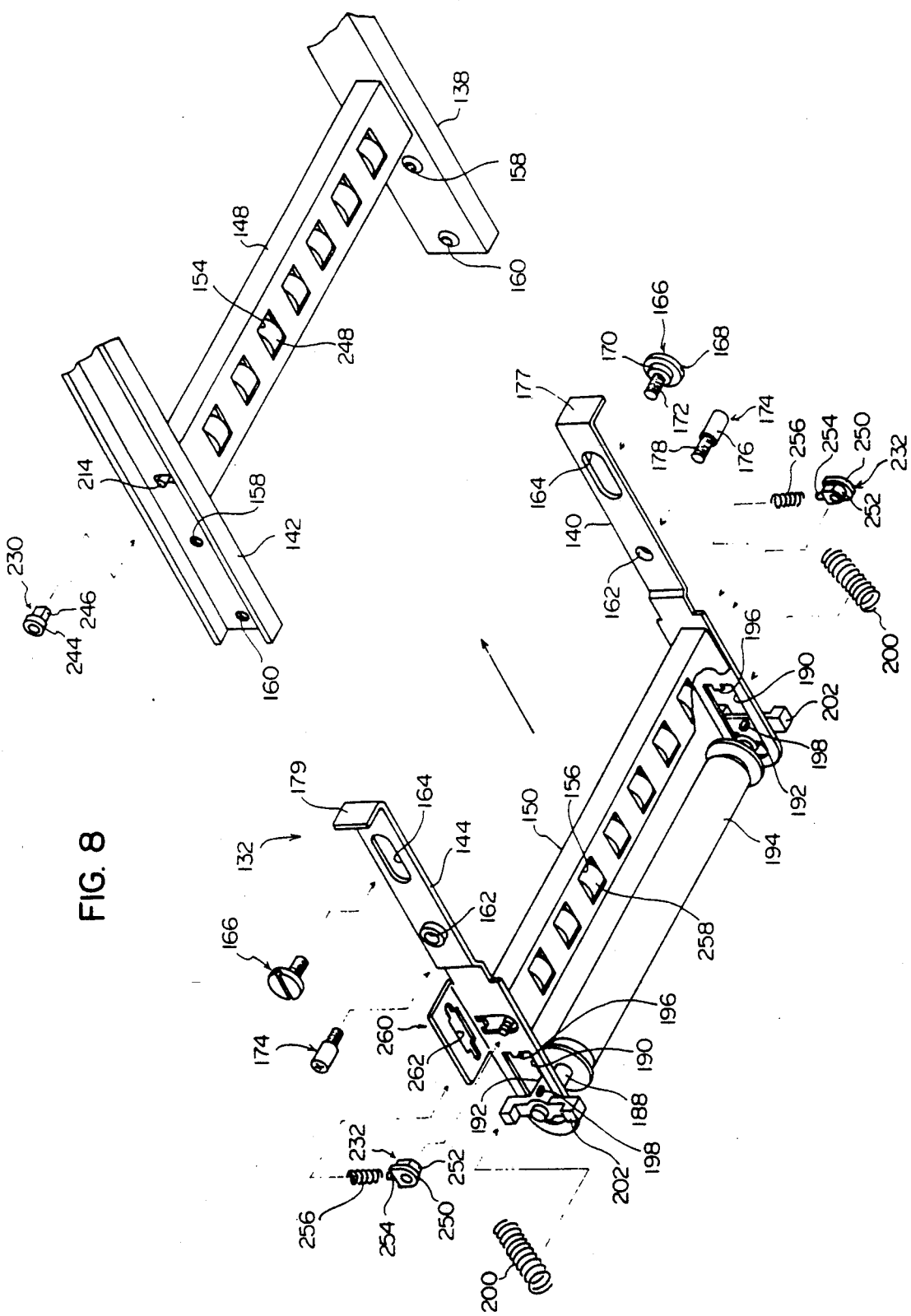

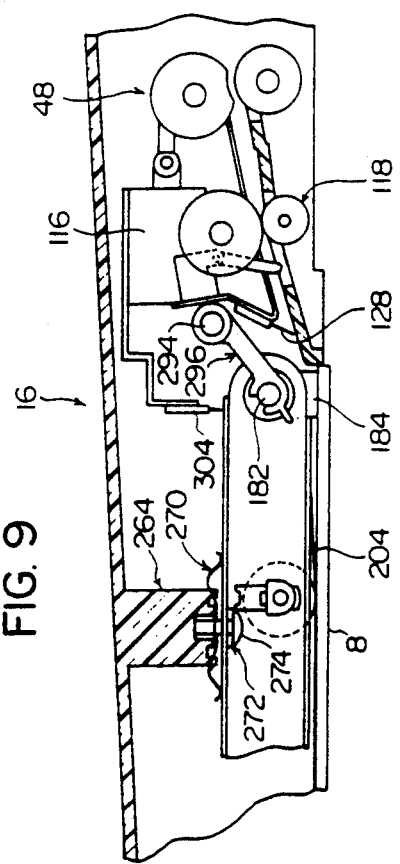

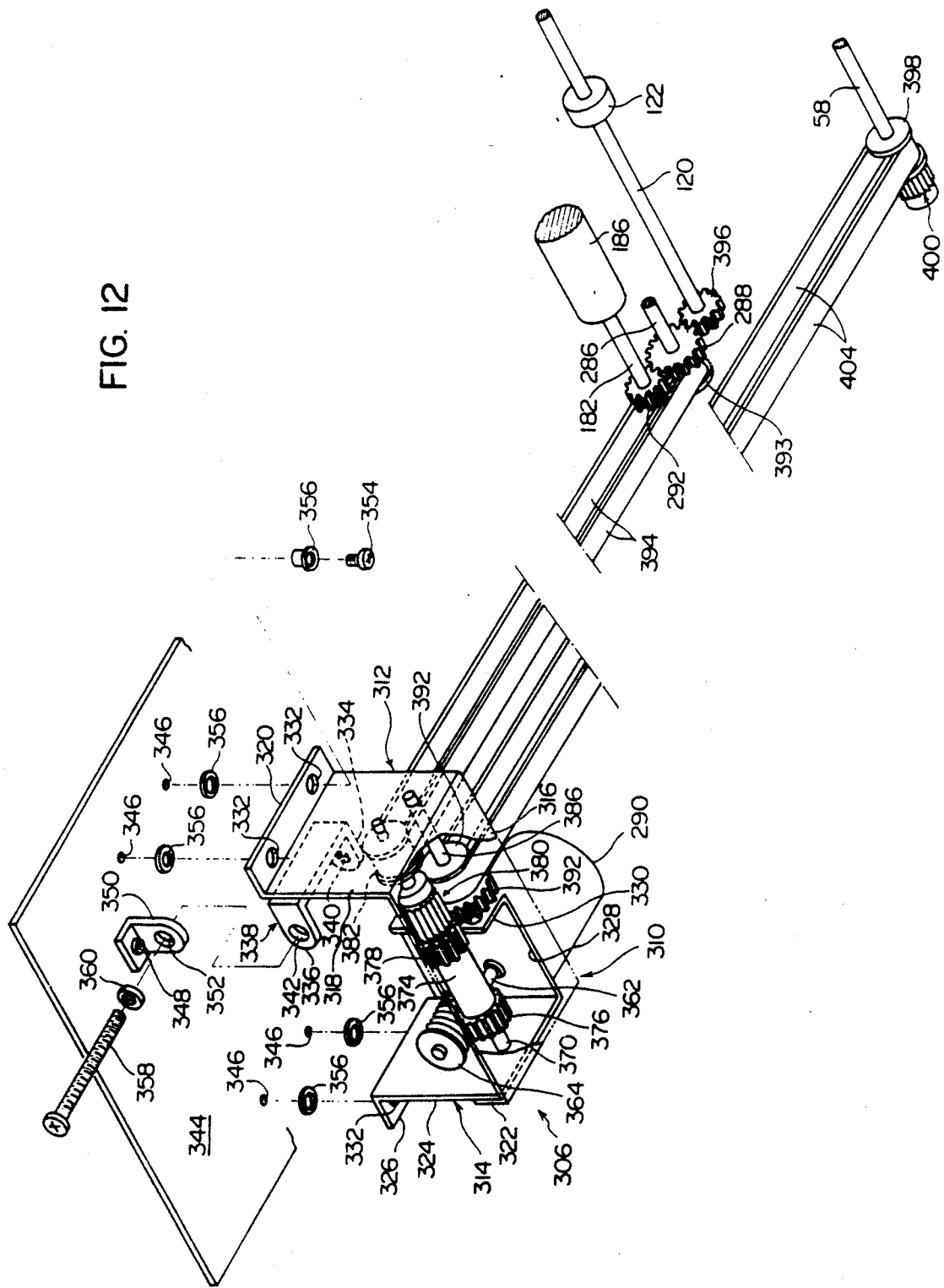

AUTOMATIC DOCUMENT CONVEYING DEVICE FOR AN IMAGE PROCESSING MACHINE

This is a division of U.S. patent application Ser. No. 07/414,321 filed Sep. 29, 1989, now U.S. Pat. No. 5,060,923.

FIELD OF THE INVENTION

This invention relates to an automatic document conveying device to be applied to an image processing machine such as an electrostatic copying machine or an image reader, and to an image processing machine equipped with the automatic document conveying device.

DESCRIPTION OF THE PRIOR ART

To automate the handling of documents in an operation of image copying or an operation of image reading, it is the widespread practice to provide an automatic document conveying device in the image processing machine. Japanese Laid-Open Patent Publications Nos. 91747/1978 and 118551/1985 and Japanese Laid-Open Utility Model Publication No. 49348/1986 may be cited as typical examples of the prior art disclosing such automatic document conveying device.

The image processing machine is equipped with a housing, and a transparent plate for positioning of documents thereon is disposed on the upper surface of the housing. The automatic document conveying device further includes an opening-closing frame member and a stationary frame member. The opening-closing frame member is mounted on the housing such that it can pivot freely between a closed position at which it covers the transparent plate and an open position at which it exposes the transparent plate to view, with a pivot axis extending along the rear edge of the transparent plate being as a center. The stationary frame member is mounted on the housing adjacent to the upstream end of the transparent plate, and a document table is disposed on the stationary frame member. Also provided in the automatic document conveying device are a document carrying-in passage extending from the document table to the upstream end of the transparent plate, and a document carrying-out passage extending from the downstream end of the transparent plate. In an automatic document conveying device of the type having the function of reversing a document as required, a document reversing passage branching from the document carrying-out passage and extending to the downstream end of the transparent plate is also disposed. The automatic document conveying device further includes a document sending means for sending out a plurality of sheet-like documents on the document table one by one to the document carrying-in passage, a document carrying-in means for carrying the sheet-like documents delivered to the document carrying-in passage toward the transparent plate, a document conveying means positioned opposite to the transparent plate, and a document discharge means for conveying the sheet-like documents delivered to the document carrying out passage from the surface of the transparent plate. Where the automatic document conveying device has the above-mentioned document reversing function, there is also provided a discharging-reversing control member adapted to be selectively held at a discharging position at which the sheet-like documents delivered to the document carrying-out passage are discharged through the document carrying-out passage and a reversing position at which the sheet-like documents delivered to the document carrying-out passage are introduced into the document reversing passage. The document discharge means also functions as reversing means for returning the sheet-like documents to the surface of the transparent plate through the document reversing passage. The document conveying means is generally constructed of a conveyor belt unit comprised of a shaft to be driven, a follower shaft, and an endless belt wrapped around these shafts.

The conventional automatic document conveying device, however, has the following problems to be solved.

Firstly, even when the transparent plate is exposed to view by opening the opening-closing frame member, the document carrying-in passage is not opened. Accordingly in the event a sheet-like document blocks the document carrying-in passage, the document is difficult to remove and is likely to be damaged.

Secondly, the conveyor belt unit constituting the document conveying means positioned opposite to the transparent plate is mounted on the opening-closing frame member. In order for the conveyor belt unit to function properly, it is important that the conveyor belt unit be brought to a certain positional relationship with respect to the transparent plate when the opening-closing frame is held at the closed position. It is not easy to position the conveyor belt unit in this certain positional relationship because there may be an error in the mounting of the opening-closing frame member on the housing of the image processing machine or an error in the mounting of the conveyor belt unit on the opening-closing frame member. Thus, the positioning of the conveyor belt unit requires expertise, and a microadjustment operation becomes necessary.

Thirdly, in the assembling or repairing the conveyor belt unit constituting the document conveying means, it is necessary to wrap the endless belt properly about the shaft to be driven and the follower shaft. This wrapping operation is by no means easy and cannot be carried out rapidly.

Fourthly, a guide roller and a spring member for biasing the guide roller elastically are also annexed to the conveyor belt unit constituting the document conveying means, and the guide roller elastically acts on the operative travelling section of the endless belt. Usually, a plate spring is used as the spring member. Owing to errors in assembling, the elastic action of the spring member can greatly vary, and the required elastic action cannot be obtained with certainty. If a coil spring is used in place of the plate spring, the required elastic action can be more certainly obtained. The cost of building the device, however, increases, owing to the structure required for providing the coil spring in position.

Fifthly, the conveyor belt unit or other conveying means, such as a conveyor roller pair used in conveying sheet-like documents is drivingly coupled to a drive source which may be an electric motor. Generally, a transmission belt mechanism is generally used in such drive coupling. In the transmission belt mechanism, an idler pulley for tension adjustment, adapted to be elastically biased by elastic means, is disposed to maintain the endless belt in a certain required tension state. However, the cost of making such idler pulley for tension adjustment is not low enough.

Sixthly, a specific means used for conveying documents, such as document discharging-reversing means, having the dual function of discharging the document and reversing it is in many cases comprised of a combination of a roller to be driven and a follower roller to be pressed elastically against the driven roller. The follower roller must be mounted elastically via a suitable elastic supporting means such as a spring steel plate. This mounting operation is relatively troublesome, and the mounting structure is relatively bulky.

Seventhly, for meeting the consumer's desire, it is convenient to mount the above-mentioned automatic document conveying device having the document reversing function and an automatic document conveying device having no document reversing function selectively on the housing of an image processing machine. With the automatic document conveying device of the document reversible type, the sheet-like document delivered from the downstream end of the transparent plate disposed on the upper surface of the housing is desirably guided and deflected upwardly at a position spaced from the downstream end of the transparent plate by a required distance. On the other hand, when the automatic document conveying device having no document reversing function is to be mounted on the housing, the document is desirably guided and deflected upwardly at a position sufficiently in proximity to the downstream end of the transparent plate for a reason will be given hereinafter. This desire cannot be satisfied without involving a large increase in the cost of production.

Eighthly, the reduction in the cost of production and size could be realized if for a plurality of drive means to be driven, a common driving source and a common cluth means for drive coupling can be used. This cannot be achieved without giving rise to other problems such as a reduction in operating speed and in operability.

SUMMARY OF THE INVENTION

A first object of this invention is to provide an automatic document conveying device in which the document carrying-in passage is kept open when the opening-closing frame member is opened, and therefore, in the event that a sheet-like document jams up in the document carrying-in passage, the document can be easily and rapidly removed without damaging it by opening the opening-closing frame member and thus opening the document carrying-in passage.

A second object of this invention is to provide a novel and excellent automatic document conveying device in which when the opening-closing frame member is held at the closed position, the conveyor belt unit constituting the document conveying means is accurately positioned in a certain positional relationship with respect to the transparent plate without the need for a complex microadjustment operation.

A third object of this invention is to provide a novel and excellent automatic document conveying device in which in the assembling or repairing of the conveyor belt unit constituting the document conveying means, the endless belt can be very easily and rapidly wrapped about the driven shaft and the follower shaft.

A fourth object of this invention is to provide an automatic document conveying device in which in the conveyor belt unit constituting the document conveying means, a coil spring which gives a stable elastic action can be used as the spring member energizing the guide roller elastically, without giving rise to other problems such as an increase in the cost of production.

A fifth object of this invention is to provide an automatic document conveying device in which the endless belt of the transmission belt mechanism disposed between the drive source, such as an electric motor; and the conveying means; such as the conveyor belt unit for conveying sheet-like documents or a conveying roller pair; can be maintained under a certain required tension without the need for additional devices such as an idler pulley for tension adjustment, thus enabling the cost of production to be reduced.

A sixth object of this invention is to provide a novel and excellent automatic document conveying device in which the follower roller to be pressed elastically against the driven roller can be mounted in position via an elastic supporting member made of spring steel plate because of a compact mounting structure that requires only a simple mounting operation.

A seventh object of this invention is to cause a sheet-like document delivered from the downstream end of the transparent plate to be guided and deflected upwardly at a position spaced from the downstream end of the plate by a predetermined distance when an automatic document conveying device having the document reversing function is selectively mounted on an image processing machine, and to cause a sheet-like document delivered from the downstream end of the transparent plate to be guided and deflected upwardly at a position sufficiently in promixity to the downstream end of the transparent plate when an automatic document conveying device having no document reversing function is selectively mounted on the image processing machine, without involving any great increase in the cost of production in both cases.

An eighth object of this invention is to provide an automatic document conveying device in which the document carrying-in means for carrying in a sheet-like document toward the transparent plate and the document conveying means positioned opposite to the transparent plate are drivingly coupled to a common driving source via a common clutch means without giving rise to other problems such as reduction of the operating speed or reduction of operability, thereby permiting a decrease in the cost of production.

Other objects of the invention will become apparent from the following detailed description of preferred embodiments of the automatic document conveying device of this invention taken in conjunction with the accompanying drawings.

BRIEF DESCRIPTION OF THE DRAWINGS

FIG. 8 is an exploded perspective view showing part of the conveyor belt unit of FIG. 7.

FIG. 9 is a side view showing part of the conveyor belt unit of FIG. 7.

FIG. 10 is a perspective view showing a link used in the conveyor belt unit of FIG. 7.

FIG. 11 is a partial sectional view showing the link used in the conveyor belt unit of FIG. 7 and its related structure.

FIG. 12 is an exploded perspective view of a driving unit disposed in the conveyor belt unit of FIG. 7.

FIG. 13 is a partial sectional view showing a document placing restriction member disposed in the upper surface of the housing of the electrostatic copying machine in the embodiment of FIG. 1;

DETAILED DESCRIPTION OF PREFERRED EMBODIMENTS

With reference to the accompanying drawings, an image processing machine equipped with a preferred embodiment of the automatic document conveying device constructed in accordance with this invention will be described in detail.

Outline of the General Structure

Figure 1:
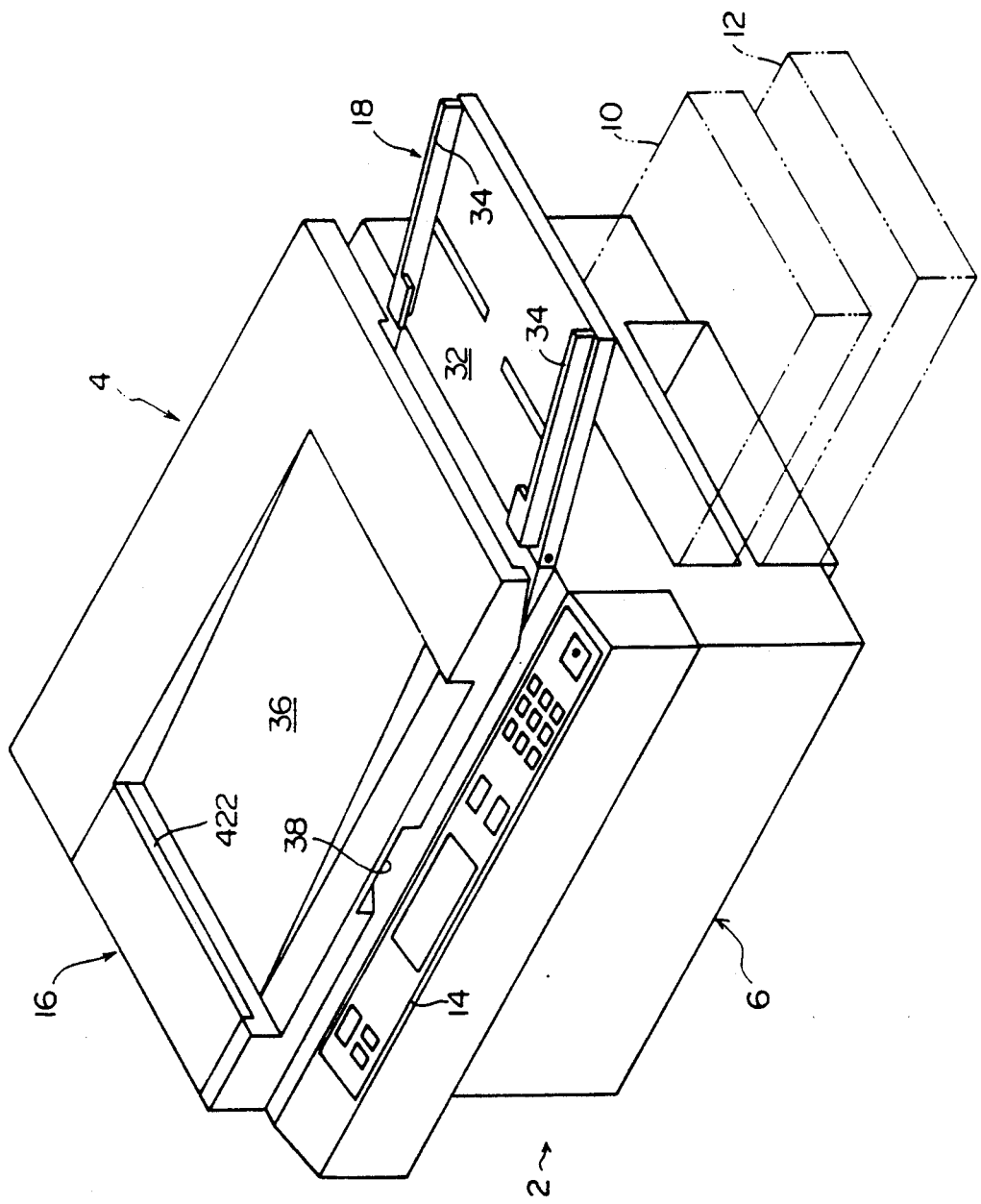
FIG. 1 is a perspective view showing one embodiment of an automatic document conveying device having a document reversing function constructed in accordance with this invention and an electrostatic copying machine equipped with this device.
Figure 2:
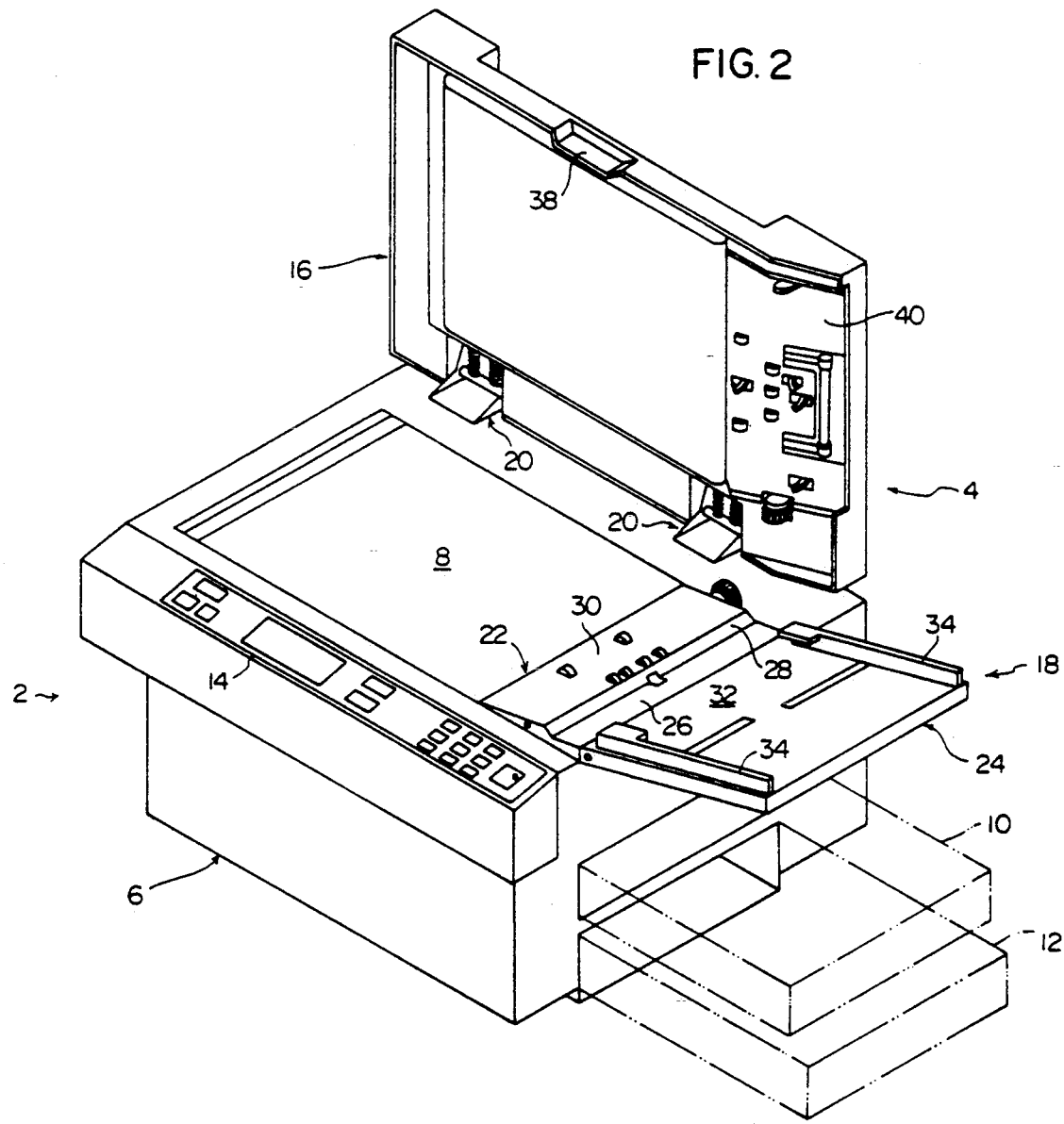
FIG. 2 is a perspective view of the embodiment of FIG. 1 with the opening-closing frame member of the device being open.

FIGS. 1 and 2 show an electrostatic copying machine shown generally at 2 and an automatic document conveying device shown generally at 4 mounted on the electrostatic copying machine 2. The electrostatic copying machine 2 of a known type has a nearly parallelpipedal housing 6, and a rectangular transparent glass plate 8 (FIG. 2) is disposed centrally on the upper surface of the housing 6. Copying paper cassettes 10 and 12 holding a plurality of copying paper sheets which may be plain paper sheets are detachably loaded in one side (the right side as viewed from the front) of the housing 6 as shown by two-dot chain lines. At the other side (the left side as viewed from the front) of the housing 6 is disposed a receiving tray or sorter (not shown) for collecting paper sheets discharged from the housing 6. An operating panel 14 having arranged thereon a plurality of operating switches and displays is disposed in the front edge portion of the upper surface of the housing 6. Although not shown in the drawings, various constituent elements, including a rotating drum having an electrostatographic photosensitive layer on its surface, are provided in the housing 6. As is well known in the art, a toner image is formed on the rotating drum by an image-forming step involving document scanning and exposure, in which a document placed on the transparent plate 8 (FIG. 2) with its surface to be copied being directed downwardly is optically scanned and the reflected image of the document is projected onto the rotating drum. The toner image is transferred to a paper sheet supplied from the paper cassette 10 or 12, and after the transferred toner image is fixed, the paper sheet is discharged into the receiving tray or sorter.

The automatic document conveying device 4 in which various improvements have been made by the present invention includes an opening-closing frame member 16 and a stationary frame member 18. The opening-closing frame member 16 is mounted on the housing 6 via a pair of mounting mechanisms 20 of a known type attached to the rear edge portion of the housing 6 in a longitudinally spaced-apart relationship. Each of the mounting mechanisms 20 has a suspending leg 19 (FIG. 5), and a pair of mounting openings 21 (FIG. 4) are formed in a longitudinally spaced-apart relationship in the rear edge portion of the housing 6. The suspending legs 19 of the mounting mechanisms 20 are inserted into the mounting openings 21. The opening-closing frame member 16 is free to pivot between a closed position shown in FIG. 1 and an open position shown in FIG. 2 about a pivot axis extending along the rear edge of the transparent plate (more specifically, in parallel to the rear edge of the transparent plate 8 and slightly rearwardly and upwardly thereof). As shown in FIG. 5, a permanent magnet 23 is disposed in the front edge portion of the inside of the opening-closing frame member 16, and when the frame member 16 is held at the closed position, the magnet 23 is magnetically attracted to the metallic upper surface wall of the housing 6. When the opening-closing frame member 16 is held at the closed position, the transparent plate 8 is covered with the frame member 16, and when the frame member 16 is held at the open position, the transparent plate 8 is exposed to view. When a document to be copied is manually placed on the transparent plate 8, the opening-closing frame member 16 must be opened or closed by hand.

The stationary frame member 18 is mounted on the housing 6 with its downstream end (left end) being adjacent to the upstream end of the transparent plate 8. The upstream portion of the stationary frame member 18 extends rightward beyond the right end of the housing 6. As shown in FIG. 1, when the opening-closed frame member 16 is held at the closing position, the downstream portion of the stationary frame member 18 is covered with the opening-closing frame member 16, but its upstream portion is not.

Figure 3:
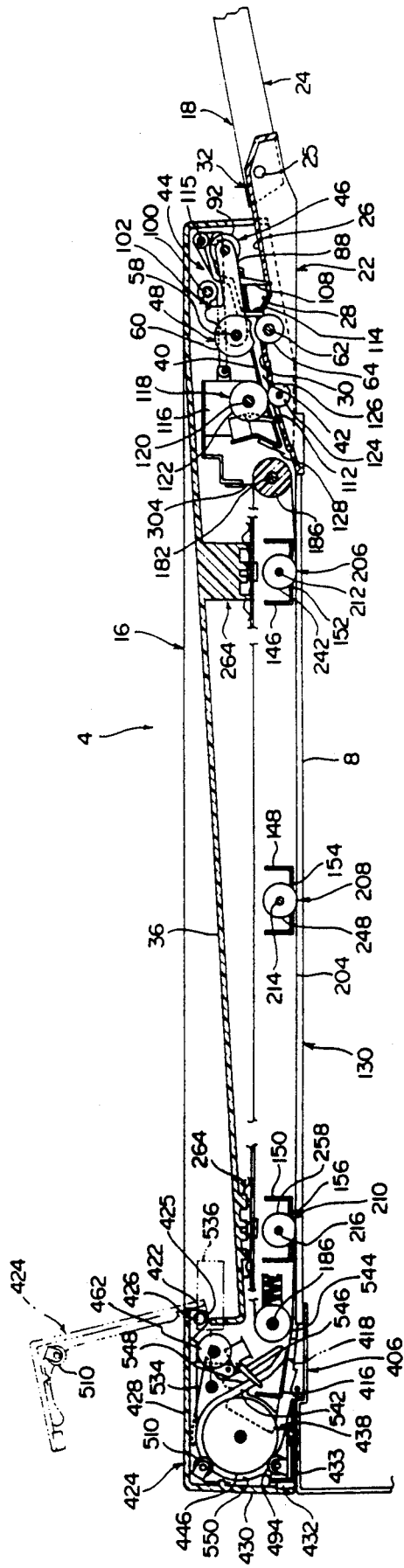
FIG. 3 is a sectional view showing the automatic document conveying device in the embodiment of FIG. 1.
Figure 4:
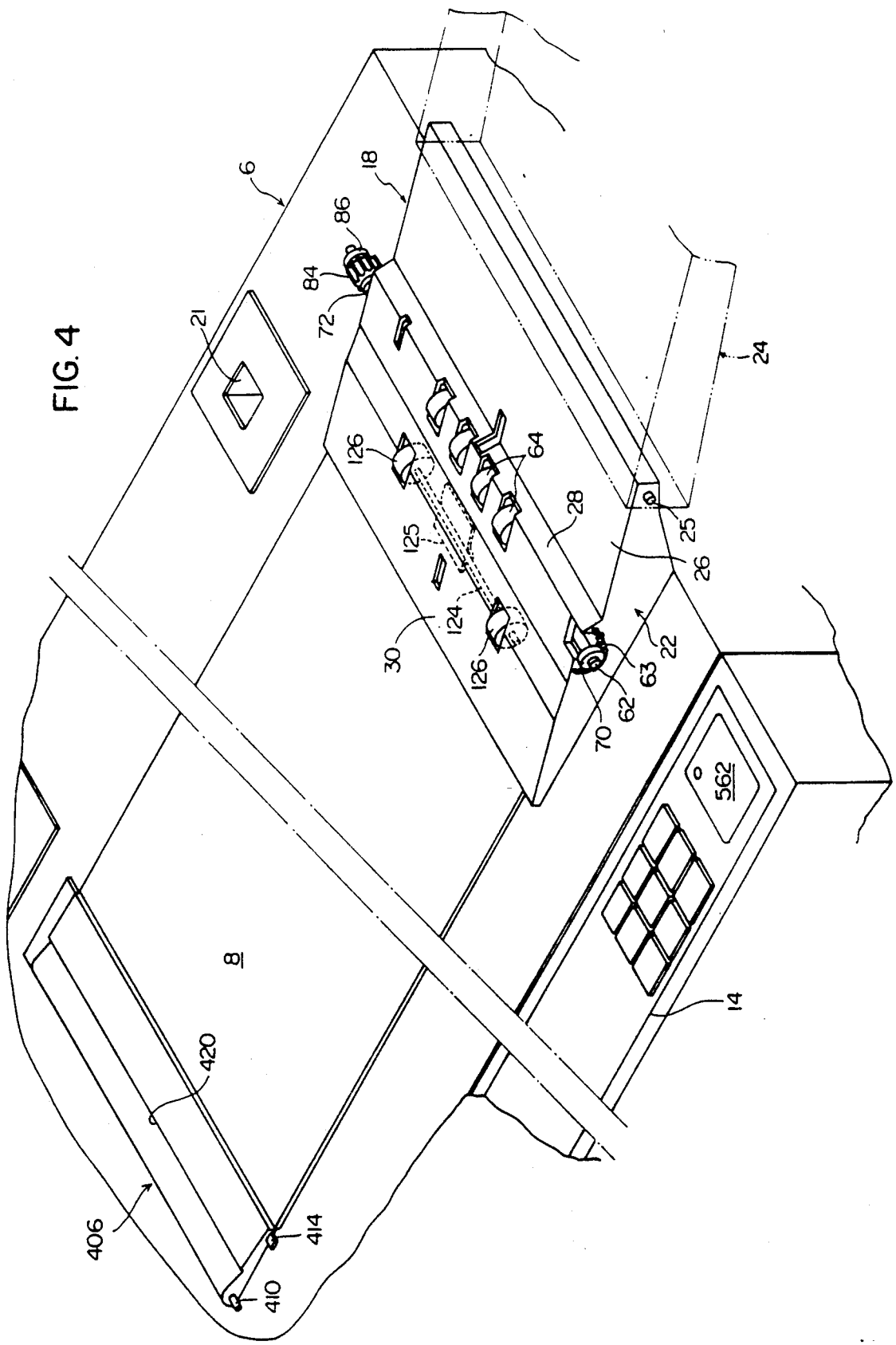
FIG. 4 is a partial perspective view showing the stationary frame member of the automatic document conveying device together with the upper surface of the housing of the electrostatic copying machine in the embodiment of FIG. 1.
Figure 5:
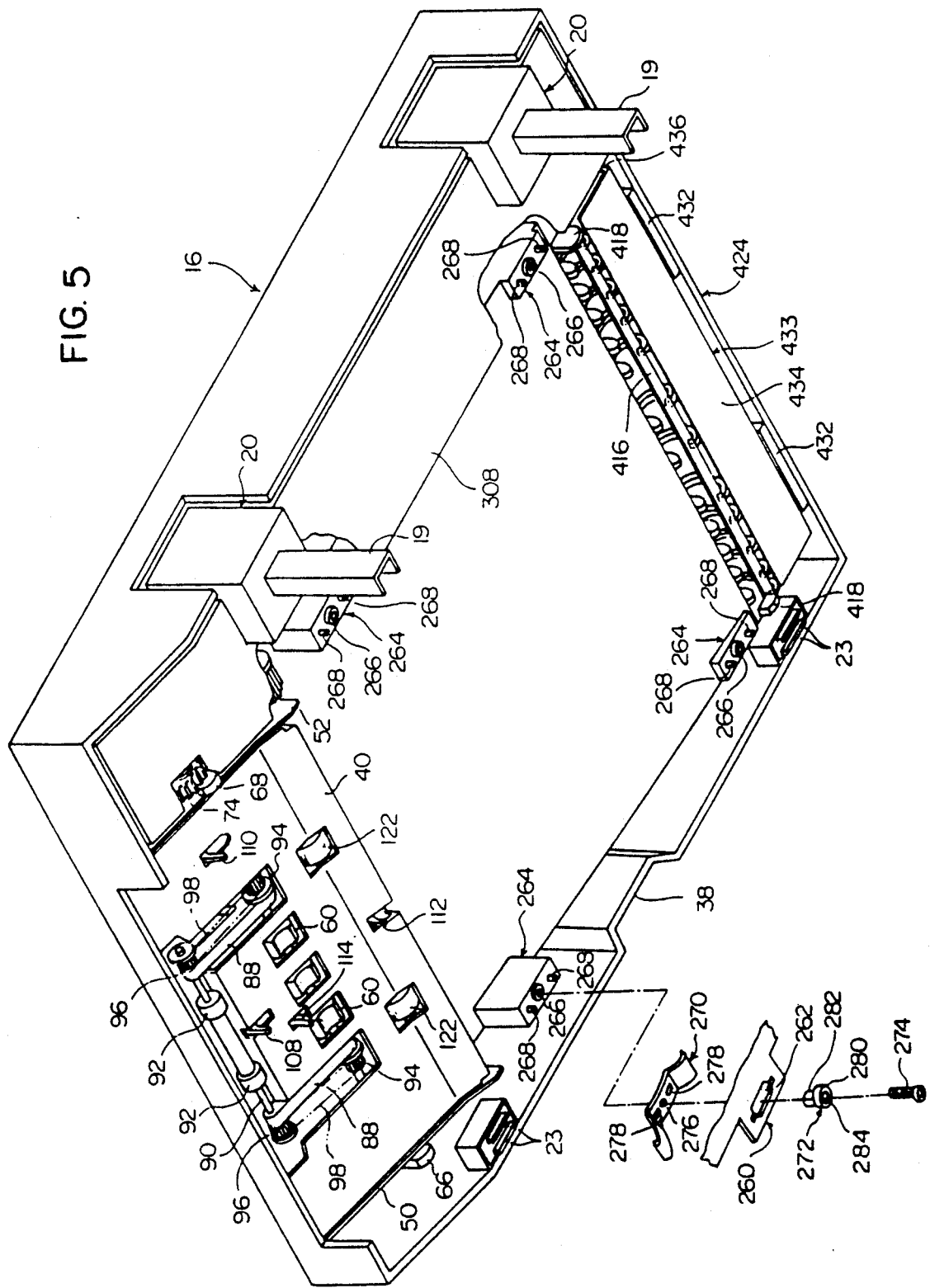
FIG. 5 is a perspective view showing the opening-closing frame member and various constituent elements provided therein.

Document Table, Document Carrying-in Passage, Document Sending Means and Document Carrying-in Means With reference to FIGS. 3 and 4 in conjunction with FIGS. 1 and 2, the stationary frame member 18 includes a base portion 22, fixed at a predetermined site on the housing 6, and an extension 24, extending to the right from the base portion 22. The downstream end portion (the left end portion) of the extension 24 is linked to the upstream end portion (the right end portion) of the base portion 22 via a linking pin 25, and as required, can pivot upwardly (counterclockwise as viewed from the front) from its usual position shown in the drawing. The upper surface of the base portion 22 has an upstream portion 26 extending downstream while being inclined slightly downwardly, an intermediate inversely inclined portion 28 inclining upwardly in the downstream direction, and a downstream portion 30 inclining slightly downwardly in the downstream direction. The upper surface of the extension 24 extends downstream while being inclined slightly downwardly, and is smoothly continuous to the upstream portion 26 of the upper surface of the base portion 22. The upper surface of the extension 24, and the upstream portion 26 and the intermediate inversely inclined portion 28 of the base portion 22 constitute a document table 32 on which to place a plurality of sheet-like documents to be copies. As shown in FIGS. 1 and 2, a pair of width restricting members 34 are mounted in a widthwise spaced-apart relationship on the upper surface of the extension 24. The pair of width restricting members 34 may be of a known form, and are free to move toward and away from each other. The distance between them is adjusted by hand to a length corresponding to the width of a sheet-like document placed on the document table 32.

With reference to FIG. 5 in conjunction with FIGS. 1 to 3, the opening-closing frame member 16 is of a box-like shape on the whole, and its under surface is open. The opening-closing frame member 16 may be formed of a suitable synthetic resin. It will be understood from FIGS. 1 and 3 that the main portion 36 of the opening-closing frame member 16 is depressed and the upper surface of the main portion 36 is inclined slightly upwardly from left to right. The upper surface of the main portion 36 constitutes a document receiving surface, and as will be further described hereinafter, a sheet-like document delivered from the transparent plate 8 is discharged onto the upper surface of the main portion 36. As clearly shown in FIGS. 1 and 2, a depression 38, which can be caught by a finger when opening or closing the opening-closing frame member 16 by hand, is formed centrally in the lower portion of the front surface of the opening-closing frame member 16.

As shown in FIGS. 3 and 5, a guide plate 40, extending downstream while being inclined slightly downwardly, is mounted on the upstream end portion (right end portion as view from the front) of the under surface of the opening-closing frame member 16. When the opening-closing frame member 16 is held at the closed position, the guide plate 40 cooperates with the downstream portion 30 of the upper surface of the base portion 22 of the stationary frame member 18 to define a document carrying-in passage 42 therebetween.

Figure 6:
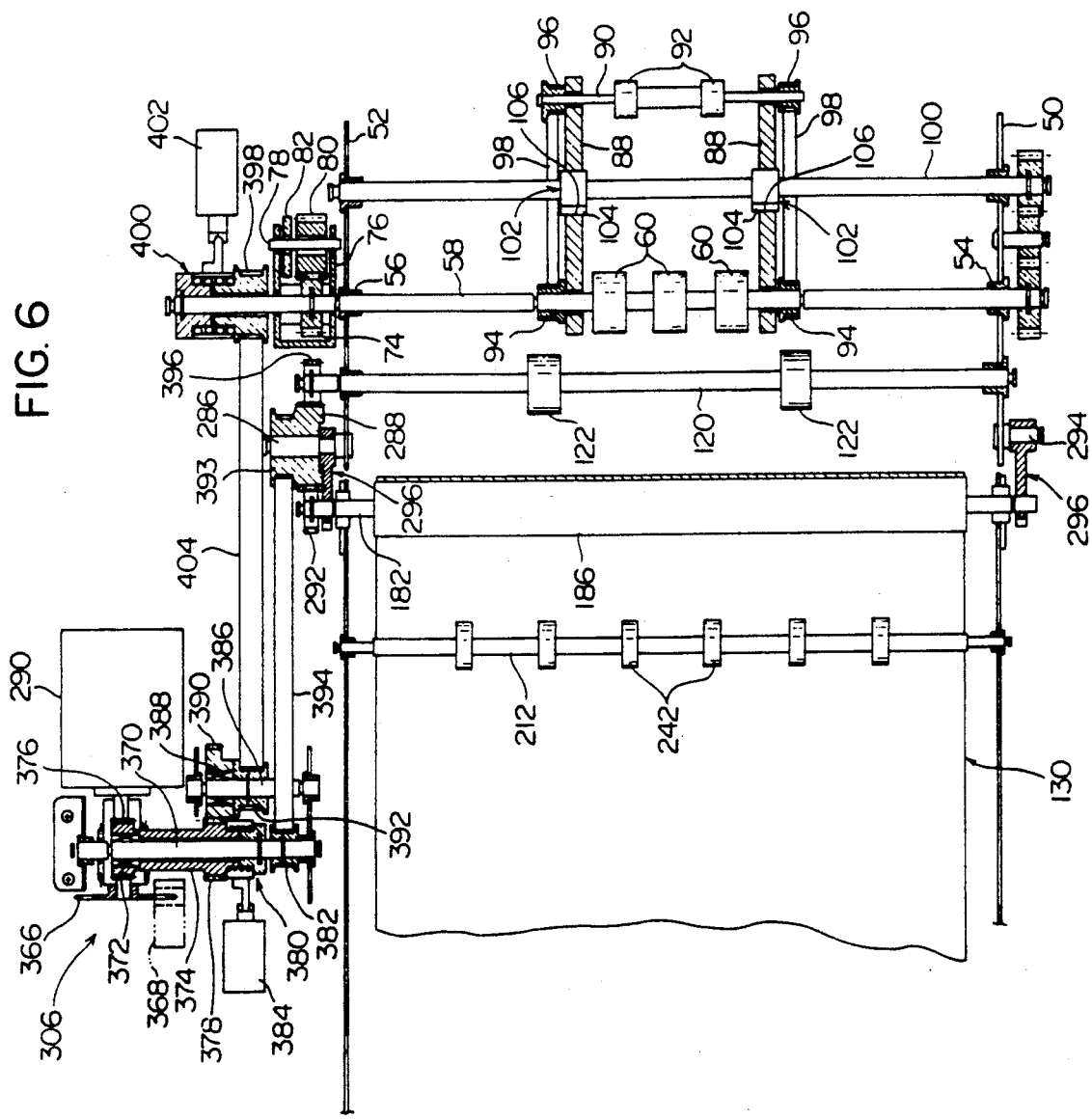
FIG. 6 is a partial sectional view showing constituent elements relating to the driving system in the automatic document conveying device in the embodiment of FIG. 1.

With reference to FIGS. 3 to 6, a document sending means 44 is provided to send out a plurality of sheet-like documents placed on the document table 32 one by one to the document carrying-in passage 42. The document sending means 44 includes a sending roller mechanism 46 and a separator roller mechanism 48. As shown in FIGS. 5 and 6, supporting side plates 50 and 52 are provided on both sides in the width direction of the guide plate 40 disposed in the upstream end portion of the opening-closing frame member 16, and an upper rotating shaft 58 is mounted rotatably between these supporting side plates 50 and 52 via bearing members 54 and 56 (FIG. 6). Three feed rollers 60, spaced properly in the axial direction, are fixed to the upper rotating shaft 58. The feed rollers 60 may be formed of a suitable material such as synthetic rubber, and they project through openings formed in the guide plate 40. As can be understood by reference to FIG. 3, the peripheral surface of the feed rollers 60 is not completely circular, and a nearly crescent cut is formed at a specific angular site of each of the feed rollers 60. Corresponding to the upper rotating shaft 58, a lower rotating shaft 62 is rotatably mounted across the front wall and the rear wall of the base portion 22 of the stationary frame member 18. The rotating shaft 62 is mounted while so that it is free to move vertically over some range, and it is elastically biased upwardly by a spring member 63 (FIG. 4). Four inversely rotatable rollers 64 are fixed to the rotating shaft 62 in a properly spaced relationship in the axial direction. These inversely rotatable rollers 64 may be formed of a suitable material such as a synthetic rubber or a synthetic resin, and they project upwardly through openings formed in the upper wall of the base portion 22 of the stationary frame member 18. The feed rollers 60 and the inversely rotatable rollers 64 are arranged alternately in the axial direction, and each of the feed rollers 60 is positioned between an adjacent pair of inversely rotatable rollers 64. The feed rollers 60 and the inversely rotatable rollers 64 cooperate with each other to constitute the separator roller mechanism 48.

As shown in FIG. 5, protrusions 66 and 68 are fixed respectively to the bearing members 54 and 56 fixed to the supporting side plates 50 and 52 and supporting the upper rotating shaft 58 rotatably. In correspondence to this, small circular plates 70 and 72 are rotatably mounted respectively on both end portions of the lower rotating shaft 62 (these end portions project forwardly and rearwardly respectively through the front wall and the rear wall of the base portion 22 of the stationary frame member 18), as depicted in FIG. 4. When the opening-closing frame member 16 is held at the closed position, the protrusions 66 and 68 come into contact with the small circular plates 70 and 72, respectively, and the lower rotating shaft 62 is lowered slightly against the elastic biasing action of the spring member 63 (FIG. 4). As a result, the distance between the upper rotating shaft 58 and the lower rotating shaft 62 is set at a predetermined value, and, therefore, the positional relation between the feed rollers 60 and the inversely rotatable rollers 64 is set as stated hereinabove. Furthermore, as shown in FIG. 6, a linking gear 74 is fixed to the rear part of the upper rotating shaft 58 extending rearwardly through the supporting side plate 52, and a bracket piece 76 is also mounted on it shaft 58 so as to be free to pivot over a predetermined range. To the bracket piece 76 is fixed a shaft 78 on which an idler gear 80 and a small circular plate 82 are rotatably mounted. The idler gear 80 is in mesh with the gear 74. A spring member (not shown) for elastically biasing the bracket piece 76 clockwise as viewed from in front is interposed between the upper rotating shaft 58 and the bracket piece 76, and the spring member acts to bias the bracket piece 76 elastically to a specific angular position. On the other hand, as illustrated in FIG. 4, a linking gear 84 is fixed to the rear portion of the lower rotating shaft 62, and a small circular plate 86 is rotatably mounted on it. When the opening-closing frame member 16 is held at the closed position, the idler gear 80 is brought into mesh with the linking gear 84, and consequently, the linking gear 74 is linked to the linking gear 84 via the idler gear 80. Thus, when the upper rotating shaft 58 is rotated clockwise as viewed from in front, the lower rotating shaft 62 is also rotated clockwise as viewed from in front. When the opening-closing frame member 16 is brought to the closed position, the small circular plate 82 comes into contact with the small circular plate 86. As a result, the bracket piece 76 is pivoted slightly counterclockwise against the elastic biasing action of the spring member, and the degree of engagement between the idler gear 80 and the linking gear 84 is set at a certain required value.

A pair of supporting arms 88 are mounted pivotally at their base end portions on the upper rotating shaft 58. The pair of supporting arms 88 extend upstream (rightward in FIG. 3), and their free ends are rotatably mounted on a rotating shaft 90. Two sending rollers 92 spaced properly in the axial direction are fixed to the rotating shaft 90. The sending rollers 92 may be formed of a suitable material such as a synthetic rubber. As shown in FIGS. 5 and 6, toothed pulleys 94 are also fixed to the upper rotating shaft 58 at positions adjacent respectively to the base end portions of the supporting arms 88. In correspondence to the toothed pulleys 94, toothed pulleys 96 are fixed to the opposite end portions of the rotating shaft 90. A timing belt 98 is wrapped about the toothed pulleys 94 and 96. Accordingly, when the upper rotating shaft 58 is rotated clockwise as viewed from in front in the manner to be described below, the rotation of the upper rotating shaft 58 is transmitted to the rotating shaft 90 via the toothed pulleys 94, the timing belt 98 and the toothed pulleys 96, and the rotating shaft 90 is also rotated clockwise as viewed from in front. A cam shaft 100 is also rotatably mounted as shown in FIGS. 3 and 6 between the supporting side plates 50 and 52 disposed in the upstream end portion of the opening-closing frame member 16. A pair of cams 102 corresponding to the pair of supporting arms 88 are fixed to the cam shaft 100. A operating protrusion 104 is formed on each of the cams 102, and a flat restrained surface 106 is formed on each of the supporting arms 88. When the cams 102 are held at a restraining position shown in FIGS. 3 and 6, operating protrusions 104 of the cams 102 come into engagement with restrained surfaces 106 of the supporting arms 88, and thereby the supporting arms 88 are restrained at an elevated position shown in FIG. 3. When the supporting arms 88 are restrained at the elevated position, the sending rollers 92 are spaced upwardly from the upper surface of the document table 32 by a predetermined distance. When the cam shaft 100 and the cams 102 fixed to it are rotated clockwise in FIG. 3 in the manner to be described, the operating protrusions 104 of the cams 102 leave the restrained surfaces 106 of the supporting arms 88. Thus, the pair of supporting arms 88 pivot clockwise in FIG. 3 about the upper rotating shaft 58 as a center owing to their own weight and the weight of the rotating shaft 90 mounted across their free ends. Consequently, the rotating shaft 90 and the sending rollers 92 mounted on it are lowered, and the sending rollers 92 come into contact with the sheet-like document placed on the document table 32. When the cam shaft 100 and the cams 102 fixed to it are rotated through one turn and returned to the restraining position shown in FIG. 3, the operating protrusions 104 act on the restrained surfaces 106 of the supporting arms 88 to return the supporting arms 88 to the elevated position and restrain them at this elevated position.

With reference again to FIGS. 3 to 5, three document detectors, that is, a detector 108 for detecting a placed document, a detector 110 for detecting a conveyed document, and a detector 112 for detecting a carried-in document are mounted on the guide plate 40 disposed in the upstream end portion of the opening-closing frame member 16. Each of the detectors 108, 110 and 112 has a detecting arm projecting downwardly through an opening formed in the guide plate 40. The tip of the detecting arm advances into an opening formed in the upper surface of the base portion 22 of the stationary frame member 18. The detecting arm of the detector 108 is disposed in relation to the downstream end portion of the document table 32, and when a sheet-like document is placed on the document table 32, the detector 108 detects this sheet-like document (a plurality of sheet-like documents are placed on the document table 32 with their leading edges in contact with, or in proximity to, the intermediate inversely inclined portion 28 of the upper surface of the base portion 22 in the stationary frame member 18). The detecting arm of the detector 110 is disposed in a position which is at the upstream end of the document carrying-in passage 42 and is displaced rearwardly in the width direction, and when a sheet-like document having a width above a certain value is delivered to the document carrying-in passage 42, the detector 110 detects it. The detecting arm of the detector 112 is disposed in relation to the center of the downstream end portion of the document carrying-in passage. The detector 112 detects the leading and trailing edges of a sheet-like document conveyed through the document carrying-in passage 42. On the basis of the leading and trailing edges of the sheet-like document as detected by the detector 112, the length of the document is detected. Furthermore, whether the width of the document is above a certain value or not is determined on the basis of whether the detector 110 detects the document or not. Thus, the size of the sheet-like document (for example, B5, A4 or B4 of JIS standards) is detected.

In the illustrated embodiment, having regard to the downstream end of the document table 32, a document feed hampering member 114 is mounted on the guide plate 40 disposed in the upstream end portion of the opening-closing member 16. As shown in FIG. 3, the document feed hampering member 114 is fixed to a rotatable pin 115 extending in the width direction (in a direction perpendicular to the sheet surface in FIG. 3). A spring member (not shown) and an electromagnetic solenoid 116 are annexed to the document feed hampering member 114 positioned centrally in the width direction. The spring member elastically biases the document feed hampering member 14 counterclockwise in FIG. 3 and holds it at a hampering position shown in FIG. 3. When the document feed hampering member 114 is held at the hampering position, the suspending legs of the document feed hampering member 114 extend downwardly through openings formed in the guide plate 40, and accurately hamper the downstream movement of sheet-like documents placed on the document table 32 beyond the document feed hampering member 114. When the electromagnetic solenoid 116, constituting hampering member control means, is energized, the document feed hampering member 114 is pivoted clockwise in FIG. 3 to a retracted position. At the retracted position, the suspending legs move upwardly from the guide plate 40 to permit feeding of sheet-like documents on the document table 32 to the document carrying-in passage 42. When the electromagnetic solenoid 116 is de-energized, the document feed hampering member 114 is returned to the hampering position by the elastic biasing action of the spring member.

Again, with reference to FIGS. 3 to 6, a document carrying-in means 118, for carrying in the sheet-like document delivered from the document table 32 to the document carrying-in passage 42 toward the transparent plate 8, is provided in the document carrying-in passage 42. As shown in FIGS. 3, 5 and 6, an upper rotating shaft 120 is rotatably mounted across the upper supporting side plates 50 and 52 disposed in the upstream end portion of the opening-closing frame member 16, and two driven carrying-in rollers 122 are fixed to the upper rotating shaft 120 at a suitable interval in the axial direction. The carrying-in rollers 122 may be formed of a suitable material such as a synthetic rubber, and they project through openings formed in the guide plate 40. As shown in FIGS. 3 and 4, a lower rotating shaft 124 is rotatably mounted beneath the upper surface wall of the base portion 22 of the stationary frame member 18. Two follower carrying-in rollers 126 are rotatably mounted on the lower rotating shaft 124 at a suitable interval. The lower rotating shaft 124 is adapted to be free to descend and ascend over a predetermined range and is elastically biased upwardly by the spring member 125. The follower carrying-in rollers 126 may be formed of a suitable material such as a synthetic rubber or resin, and they project upwardly through openings formed in the upper surface wall of the base portion 22. As can be understood by reference to FIG. 3, when the opening-closing frame member 16 is held at the closed position, the driven carrying-in rollers 122 come into contact with the follower carrying-in rollers 126. As a result, rollers 126 and 122 are slightly lowered against the elastic biasing action of the spring member 125. When the upper rotating shaft 120 and the driven carrying-in rollers 122 fixed to it are rotated clockwise in FIG. 3, the lower rotating shaft 124 and the carrying-in rollers 126 fixed to it are accordingly rotated counterclockwise in FIG. 3. Consequently, the sheet-like document is conveyed downstream by the cooperative action of the carrying-in rollers 122 and 126.

As shown in FIG. 3, a charge-eliminating brush 128, known per se, is mounted on the downstream end of the guide plate 40. The charge-eliminating brush 128 extends widthwise and removes electrostatic charges from the upper surface of the sheet-like document carried onto the transparent plate 8 by acting on the document.

In the automatic document conveying device constructed in accordance with this invention, the document carrying-in passage 42 is defined between the under surface of the upstream end portion of the opening-closing frame member 16 (more specifically, the under surface of the guide plate 40) and the upper surface of the downstream portion of the stationary frame member 18 (more specifically, the upper surface of the downstream portion of the upper surface wall of the base portion 22) when the opening-closing frame member 16 is held at the closed position. The sending roller 92, the feed roller 60 cooperating with the inversely rotating roller 64, and the carrying-in rollers 122 cooperating with the carrying-in rollers 126 are mounted on the opening-closing frame member 16, whereas the inversely rotating roller 64 cooperating with the feed roller 60, and the introduction rollers 126 cooperating with the introduction rollers 122 are mounted on the stationary frame member 18. Accordingly, when the opening-closing frame member 16 is opened, the document carrying-in passage 42 is completely kept open. Hence, in the event that a sheet-like document jams in the document carrying-in passage 42, the document can be easily and rapidly removed by accessing the document carrying-in passage 42 without damaging the document, by opening the opening-closing frame member 16. Furthermore, the feed rollers 60 and the inversely rotating rollers 64, when soiled, can be easily cleaned.

Document Conveying Means (Conveying Belt Unit)

Figure 7:
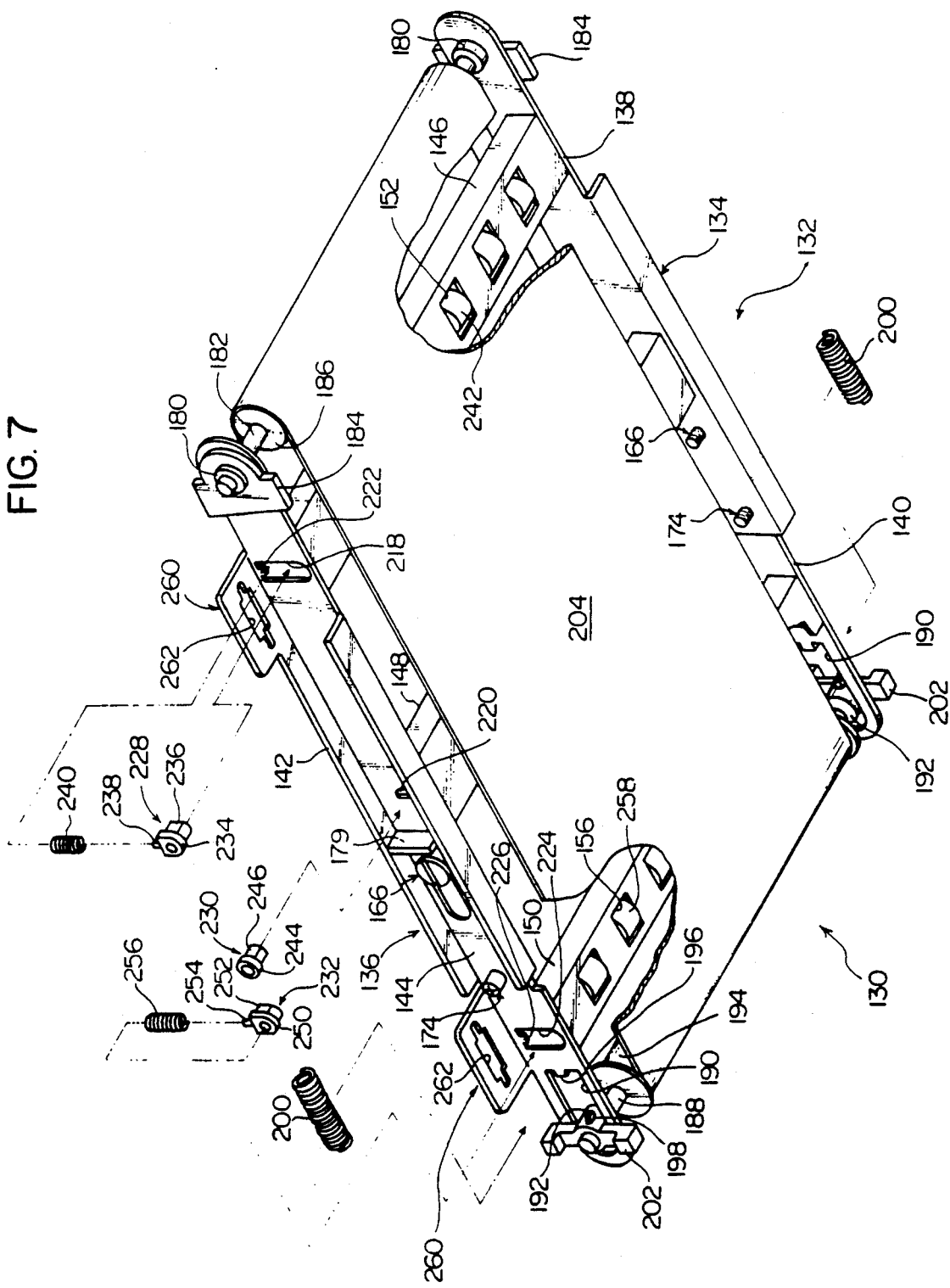
FIG. 7 is a perspective view showing the conveyor belt unit disposed in the automatic document conveying device in the embodiment of FIG. 1.

A conveyor belt unit shown generally at 130, which constitutes a document conveying means, is mounted on the main portion of the opening-closing frame member 16. As shown in FIG. 3, the conveyor belt unit 130 is positioned opposite the transparent plate 8 when the opening-closing frame member 16 is held at the closed position. With reference to FIGS. 7 and 8, the conveyor belt unit 130 includes a unit frame 132 comprising a front frame member 134 and a rear frame member 136 spaced a predetermined distance from each other in the width direction. The front frame member 134 includes a driven-side supporting plate 138 and a follower-side supporting plate 140, and likewise, the rear frame member includes a driven-side supporting plate 142 and a follower-side supporting plate 144. Two laterally extending members 146 and 148 spaced properly from each other in the conveying direction are fixed by suitable means such as set screws (not shown) across the driven-side supporting plate 138 of the front frame member 134 and the driven-side supporting plate 142 of the rear frame member 136, and one laterally extending member 150 is fixed by means of a set screw (not shown) across the follower-side supporting plate 140 of the front frame member 134 and the follower-side supporting plate 144 of the rear frame member 136. Thus, the driven-side supporting plates 138 and 142 and the laterally extending members 146 and 148 constitute a driven-side half frame, and the follower-side supporting plates 140 and 144 and the laterally extending member 150 constitute a follower-side half frame. As can be seen from FIG. 3, each of the laterally extending members 146, 148 and 150 has a channel-shaped cross-section with an open top. A plurality of openings 152, 154 and 156 are formed respectively in the bottom walls of the laterally extending members 146, 148 and 150.

The manner of linking the driven-side unit half frame with the follower-side unit half frame is as described below. Two screw holes 158 and 160 spaced a predetermined distance in the conveying direction are formed in the downstream end portion of each of the driven-side supporting plates 138 and 142 in the driven-side unit half frame. Conveniently, these screw holes 158 and 160 are formed by burring and subsequent tapping. On the other hand a hole 162 having a relatively large diameter and a slot 164 extending in the conveying direction are formed at a predetermined interval in the conveying direction in the upstream end portion of each of the follower-side supporting plates 140 and 144 in the follower side unit half frame. Conveniently, the hole 162 is formed by burring. The slot 164 may be formed by ordinary punching. The slot 164 and the screw hole 158 are combined with a linking screw pin 166. The pin 166 has a large-diameter head portion 168, an intermediate cylindrical portion 170 and a small-diameter screw portion 172, and the outside diameter of the intermediate cylindrical portion 170 corresponds to the vertical size of the slot 164. As shown in FIG. 7, the intermediate cylindrical portion 170 of the pin 166 is inserted into the slot 164, and the small-diameter screw portion 172 is threadedly fitted with the screw hole 158. As a result, the driven-side supporting plates 138 and 142 are linked respectively with the follower-side supporting plates 140 and 144. In the above described manner of linking by a linking means composed of the pin 166, the slot 164 and the screw hole 158, the intermediate cylindrical portion 170 of the pin 166 can move in the conveying direction within the slot 164. Accordingly, the driven-side supporting plates 138 and 142 are linked with the follower-side supporting plates 140 and 144 so that they are free to move relative to each other over a predetermined distance in the conveying direction. The hole 162 having a relatively large diameter and the screw hole 160 are combined with a restraining threaded pin 174. The pin 174 has a cylindrical portion 176 and a small-diameter screw portion 178, and the outside diameter of the cylinder portion 176 corresponds to the inside diameter of the hole 162. As shown in FIG. 7, the cylindrical portion 176 of the pin 174 is inserted into the hole 162, and its small-diameter screw portion 178 is threadedly fitted with the screw hole 160. As a result, the relative movement of the driven-side supporting plate 138 and 142 and the follower-side supporting plate 140 and 144 in the conveying direction is restrained. Specifically, the pin 174, the hole 162 and the screw hole 160 constitute a restraining means and releasably restrain the relative movement of the driven-side supporting plate 138 and 142 and the follower-side supporting plate 140 and 144 in the conveying direction. Holding pieces 177 and 179 projecting outwardly in the width direction are formed in the upstream ends of the follower-side supporting plates 140 and 144, respectively.

A bearing member 180 is mounted on the upstream end portion of each of the driven-side supporting plates 138 and 142 in the driven-side unit half frame, and a shaft 182 to be driven is rotatably mounted by means of the bearing members 180. A contact member 184 (to be described further hereinbelow) is fixed to the outer circumferential surface of each bearing member 180. A belt pulley 186 is fixedly secured to the shaft 182 extending widthwise. A follower shaft 188 is rotatably mounted across the downstream end portions of the follower-side supporting plates 140 and 144 in the follower-side unit half frame. More specifically, a mounting opening 190 extending in the conveying direction is formed in the downstream end portion of each of the follower-side supporting plates 140 and 144, and a bearing member 192 is mounted in each of the mounting holes 190. A flat lower surface and a flat upper surface are formed parallel to each other on the main portion of each bearing member 192. The distance between the lower and upper surfaces of bearing member 192 corresponds to the vertical size of the mounting opening 190. The main portion of the bearing member 192 is inserted into the mounting opening 190, and thus the bearing members 192 are mounted respectively on the follower-side supporting plates 140 and 144 respectively so that the bearing members 192 can move in the conveying direction. The follower shaft 188 is journalled in the bearings 192. A belt pulley 194 is fixed to the follower shaft 188. A projecting piece 196 extending downstream is formed at the upstream side edge of each of the mounting openings 190, and a projecting piece 198 extending upstream is formed in the main portion of each of the bearing members 192. A compression coil spring 200 is disposed between the projecting pieces 196 and 198. One end of the compression coil spring 200 is fitted over the projecting piece 196 and the other end is fitted over the projecting piece 198, and thus each spring 200 is held accurately in position. These compression coil springs 200 elastically bias the bearing members 192, and therefore, the follower shaft 188 and the belt pulley 194 fixed to it, in the downstream direction. A contact member 202 (to be described further hereinafter) is formed integrally in each of the bearing members 192.

As shown in FIG. 7, an endless belt 204 is wrapped about the belt pulley 186 fixed to the shaft 182 and the belt pulley 194 fixed to the follower shaft 188. The outer circumferential surface of the endless belt 204 is white. The compression coil spring 200 elastically biases the follower shaft 188 and the belt pulley 194 fixed to it in the downstream direction, i.e. in a direction away from the shaft 182 and the belt pulley 186 fixed to it, whereby tension is produced in the endless belt 204. In the conveyor belt unit 130 improved by the invention, the endless belt 204 can be installed by the following operation when the belt unit is first assembled or the belt is replaced because of soiling or damage. First, the restraining threaded pin 174 is removed from the screw hole 160 and the hole 162 to permit the driven-side unit half frame and the follower-side unit half frame to move relative to each other in the conveying direction. Then, the driven-side unit half frame and the follower-side half frame are moved toward each other, thereby moving the shaft 182 and the belt pulley 186 fixed to it and the follower shaft 188 and the belt pulley 194 fixed to it toward each other. At this time, the follower-side unit half frame can be moved by holding the holding pieces 177 and 179 formed in the follower-side unit half frame. Thereafter, the endless belt 204 is wrapped about the belt pulley 186 and the belt pulley 194. Since at this time, the belt pulley 186 and the belt pulley 194 are caused to approach each other and the distance between the belt pulley 196 and the belt pulley 194 is decreased, the endless belt 204 can be wrapped about these belt pulleys easily and rapidly. Then, the driven-side unit half frame and the follower-side unit half frame are moved away from each other to adjust the distance between the belt pulleys 186 and 194 to a required value to produce the required tension on the endless belt 204. The restraining pin 174 is inserted into the hole 162 and threadedly fitted with the screw hole 160 to restrain the relative movement of the driven-side unit half frame and the follower-side unit half frame. In this way, the endless belt 204 can be wrapped very easily and rapidly.

Again, with reference to FIGS 3, 7 and 8, in the illustrated conveyor belt unit 130, guide roller units 206, 208 and 210 are disposed in relation respectively to the three laterally extending members 146, 148 and 150 described above. The guide roller units 206, 208 and 210 respectively include supporting shafts 212, 214 and 216 extending in the width direction. These supporting shafts 212, 214 and 216 are mounted on unit frame 132 so as to be free to rotate and to ascend and descend over a predetermined range. Two long holes 218 and 220 spaced from each other in the conveying direction are formed in each of the driven-side supporting plates 138 and 142. The long holes 218 and 220 extend in the vertical direction (i.e., a direction perpendicular to the transparent plate 8 when the opening-closing frame member 16 is in the closed position). The long hole 218 extends further upwardly than the long hole 220, and the vertical length of the long hole 218 is slightly greater than that of the long hole 220. A downwardly extending projecting piece 222 is formed at the upper edge of the long hole 218. Another long hole 224 is formed in each of the follower-side supporting plates 140 and 144. These long holes 224 may be substantially the same as the long hole 218, and a downwardly extending projecting piece 226 is formed at the upper edge of the long hole 224. Bearing members 228, 230, and 232 are disposed respectively on both ends of the supporting shafts 212, 214 and 216. In other words, the opposite ends of the supporting shafts 212, 214 and 216 are rotatably supported by the bearing members, 228 230 and 232, respectively. The bearing members 228 disposed on the opposite ends of the supporting shaft 212 have an enlarged head portion 234 and a main portion 236. The two side surfaces of the main portion 236 are flat surfaces and are parallel to each other. The distance between these flat surfaces corresponds to the lateral size of the long hole 218. An upwardly extending projecting piece 238 is formed in the main portion 236 of the bearing members 228. The main portion 236 of the bearing member 228 is inserted into the long hole 218, and therefore, the supporting shaft 212 is mounted so that it is free to ascend or descend along the long hole 218. A compression coil spring 240 is disposed between the projecting piece 222 of the long hole 218 and the projecting piece 238 of the bearing member 228. The compression coil spring 240 is fitted at one end over the projecting piece 222 and at the other end over the projecting piece 238 and elastically biases the bearing member 228, and therefore the supporting shaft 212, downwardly. A plurality of rollers 242 spaced properly in the axial direction are fixed to the supporting shaft 212. The rollers 242 project downwardly through the openings 152 formed in the laterally extending member 146, and are pressed against the inside surface of the operative travelling section of the endless belt 204. As a result, the rollers 242 elastically bias the operating travelling section of the endless belt 204 downwardly and press it against the transparent plate 8. The bearing members 230 disposed on the opposite ends of the supporting shaft 214 also have an enlarged head portion 244 and a main portion 246. The two side surfaces of the main portion 246 are flat and are parallel to each other. The distance between these flat surfaces corresponds to the lateral size of the long hole 220. The main portion 246 is inserted into the long hole 220, and thus the supporting shaft 214 is mounted so as to be free to ascend or descend along the long hole 220. A plurality of rollers 248 spaced properly from each other in the axial direction are fixed to the supporting shaft 214. These rollers 248 project downwardly through the openings 154 formed in the laterally extending member 148. No spring member is provided in relation to the supporting shaft 214 and the bearing members 230, and the rollers 248 are pressed against the inside surface of the operating travelling section of the endless belt 204 by their own weight and the weights of the supporting shaft 214 and the bearing members 230. The bearing members 232 disposed on the opposite ends of the supporting shaft 216 are substantially the same as the bearing members 228 disposed on the opposite ends of the supporting shaft 212, and have an enlarged head portion 250 and a main portion 252. The two side surfaces of the main portion 252 are flat surfaces and are parallel to each other. The distance between the flat surfaces corresponds to the lateral size of the long hole 224. An upwardly extending projecting piece 254 is also formed in the main portion 252 of the bearing member 232. The main portion 252 of the bearing member 232 is inserted into the long hole 224, and thus, the supporting shaft 216 is mounted so as to be free to ascend and descend along the long hole 224. A compression coil spring 256 is disposed between the projecting piece 226 of the long hole 224 and the projecting piece 254 of the bearing member 232. The compression coil spring 256 is fitted at one end over the projecting piece 226 and at the other end over the projecting piece 254 and elastically biases the bearing member 232, and therefore the supporting shaft 216, downwardly. A plurality of rollers 258 spaced properly in the axial direction are fixed to the supporting shaft 216. These rollers 258 project downwardly through the openings 156 formed in the laterally extending member 150 and are pressed against the inside surface of the operating travelling section of the endless belt 204, whereby they elastically bias the operative travelling section of the endless belt 204 downwardly and press it against the transparent plate 8.

Now, the manner of mounting the conveyor belt unit 130 described above in a predetermined position in the opening-closing frame member 16 will be described.

As clearly shown in FIG. 7, a mounting protrusion piece 260, extending outwardly in the width direction from its upper end, is formed in each of the driven-side supporting plate 138 and the follower-side supporting plate 140 of the front frame member 134 constituting the unit frame 132 and in each of the driven-side supporting plate 142 and the follower-side supporting plate 144 of the rear frame member 136 constituting the unit frame 132 (FIG. 7 only shows the mounting protrusion pieces 260 formed in the driven-side supporting plate 142 and the follower-side supporting plate 144 of the rear from member 136). A slender slot 262, extending in the conveying direction, is formed in each of these mounting protrusion pieces 260. The central main portion of the slot 262 has a predetermined width. On the other hand, as shown in FIGS. 3 and 5, mounting block portions 264 are formed at the four corner portions of the main portion 36 of the opening-closing frame member 16 in correspondence to the mounting protrusion pieces 260. A cylindrical screwable protrusion 266 is formed centrally in the under surface of each of the mounting block portions 264, and a screw hole is formed in the protrusion 266. Furthermore, a pair of cylindrical positioning protrusions 268 located on each side of the screwable protrusion 266 are also formed on the under surface of each of the mounting block portions 264. As clearly shown in FIG. 5, each of the mounting protrusion pieces 260 is mounted on each of the mounting block portions 264 via a spring member 270, a collar member 272 and a screw member 274. The spring member 270, constituting an elastic biasing means, is formed of a spring steel plate and has a rectangular main portion and leg portions extending from both edges of the main portion extending outwardly and downwardly in the inclined state. In the main portion of the spring member 270, a centrally positioned circular hole 276 and slender holes 278 extending in the conveying direction on both sides of the circular hole 276 are formed. The collar member 272 which is conveniently formed of a synthetic resin has a head portion 280 and an axial portion 282. Both sides of the axial portion in the front-rear direction are formed as flat surfaces. The distance between the flat surfaces corresponds to the width of the central main portion of the slot 262 formed in the mounting protrusion piece 260. The axial length of the axial portion 282 is sufficiently larger than the thickness of the mounting protrusion piece 260. The outside diameter of the head portion 280, which may be circular, is larger than the width of the central main portion of the slot 262. A through-hole 284, extending through the head portion 280 and the axial portion 282, is formed in the collar member 272. As will be described below, the screw member 274 is combined with the collar member 272 by inserting the axial portion of the screw member 274 through the through-hole 284 of the collar member 272. As is seen by reference to FIGS. 3 and 9 taken in conjunction with FIG. 5, the spring member 270 is interposed between the mounting block 264 and the mounting protrusion piece 260. The positioning protrusions 268, formed in the under surface of the mounting block 264, is inserted through the slender holes 278 formed in the spring member 270 to permit the spring member 270 to bend elastically and stretch or shrink in the conveying direction (at this time, the slender hole 278 moves in the conveying direction relative to the positioning protrusion 268), but the spring member 270 as a whole is kept unmovable with respect to the mounting block 264. The axial portion 280 of the collar member 272 is inserted into the central main portion of the slot 262 formed in the mounting protrusion piece 260, and the tip of the axial portion 280 makes contact with the main portion of the spring member 270. The axial portion of the screw member 274 is inserted into the through-hole 284 and the circular hole 276 of the spring member 270, and screwed into the screw hole formed in the screwable protrusion 266. Thus, the mounting protrusion pieces 260 in the conveying belt unit 130 are mounted on the mounting blocks of the opening-closing frame member 16. Since the length of the axial portion 282 of the collar member 272 is larger than the thickness of the mounting protrusion piece 260, the mounting protrusion piece 260 can move along the axial portion 282 of the collar member 272. The spring member 270 elastically biases the mounting protrusion piece 260 downwardly. The collar member 272 extends vertically; or more specifically, it extends in a direction in which it is substantially perpendicular to the transparent plate 8 while the opening-closing frame member 16 is held at the closed position. Hence, when the opening-closing frame member 16 is at the closed position, the conveying belt unit 130 is free to move over a predetermined range in a direction perpendicular to the transparent plate 8. Furthermore, the slot 262 formed in the mounting protrusion piece 260 extends in the conveying direction, and the mounting protrusion piece 260 is free to move over a predetermined range in the conveying direction with respect to the axial portion 282 of the collar member 272. Accordingly, the conveyor belt unit 130 is free to move also in the conveying direction over a predetermined range.

As can be seen by reference to FIG. 7 taken in conjunction with FIGS. 3 and 5, when the opening-closing frame member 16 is held at the closed position shown in FIG. 3, the lower ends of the contact members 184, disposed at both end portions of the shaft 182, and the lower ends of the contact members 202, disposed at both end portions of the follower shaft 188 in the conveyor belt unit 130 make contact with the upper surface of the transparent plate 8. Consequently, the conveyor belt unit 130 is displaced slightly upwardly relative to the opening-closing frame member 16 against the elastic biasing action of the spring member 270. For the conveyor belt unit 130 to function properly, it is important to position the shaft 182, the follower shaft 188, with the endless belt 204 wrapped about them, in the conveyor belt unit 130 accurately in the required state with respect to the upper surface of the transparent plate 8. The conveyor belt unit 130 constructed in accordance with this invention can be positioned accurately and stably in the required state with respect to the upper surface of the transparent plate 8 even if some errors exist in the mounting of the opening-closing frame member 16 on the housing 6 having the transparent plate 8 or in the mounting of the conveyor belt unit 130 on the opening-closing frame member 16. This is because the contact members 184 and 202 disposed in the conveyor belt unit 130 itself make contact directly with the upper surface of the transparent plate 8.

As shown in FIGS. 6 and 9, a short mounting rod 286 is fixed to the supporting plate 52 disposed in the rear part of the upstream end of the opening-closing frame member 16. A drive gear 288 is rotatably mounted on the mounting rod 286. As will be described further hereinbelow, the drive gear 288 is drivingly coupled to a drive source 290, which may be an electric motor, and is driven by the drive source 290. The shaft 182 to be driven in the conveyor belt unit 130 extends rearwardly through the driven-side supporting plate 142, and an input gear 292 is fixed to its rear end portion. The input gear 292 is in mesh with the drive gear 288. As a result, the shaft 182 in the conveyor belt unit 130 is drivingly coupled to the drive source 290. As stated above, the conveyor belt unit 130 is moved relative to the opening-closing frame member 16 and positioned properly with respect to the transparent plate 8. To maintain the drive gear 288 and the input gear 292 in the required engaged state, it is important that even when the conveyor belt unit 130 is moved relative to the opening-closing frame member 16, the distance between the mounting rod 286 and the shaft 182 be maintained constant. To achieve this, the following structure is employed in the illustrated embodiment.

A short rod 294 is fixed to the supporting plate 50 provided in the front part of the upstream end of the opening-closing frame member 16. The short rod 294 is kept in axial alignment with the mounting rod 286. If desired, the mounting rod 286 and the short rod 294 may be formed as an integral unit. A link 296 is provided respectively between the rear end portion of the shaft 182 and the mounting rod 286 and between the front end portion of the shaft 182 extending forwardly through the drive-side supporting plate 138 and the short rod 294. The link 296 is made conveniently of a synthetic resin, and as shown clearly in FIG. 10, has a cylindrical linking portion 298 at one end and a linking portion 300 having an arcuate cross-sectional shape at the other end portion. The cross-sectional shape of the linking portion 300 is an arcuate shape extending over the range of at least 180 degrees, for example 270 degrees. A rectangular holding piece 302 is annexed to the linking portion 300. As shown in FIGS. 9 and 11, the cylindrical linking portion 298 at one end of the link 296 is rotatably fitted over the mounting rod 286 and the short rod 294. The arcuate linking portion 300 at the other end of the link 296 is linked rotatably and releasably to the rear end portion and the front end portion of the shaft 182. By elastically deforming the arcuate shape of the linking portion 300, it can be linked to the rear end portion and the front end portion of the shaft 182 or detached therefrom. At the time of linking or detachment, the holding piece 302 may be held. When the conveyor belt unit 130 moves relative to the opening-closing frame member 16, the link 296 maintains the distance between the shaft 182 and the mounting rod 286 and the distance between the shaft 182 and the short rod 294 constant. When the conveyor belt unit 130 moves relative to the opening-closing frame member 16, the presence of the link 296 causes the shaft 182 to pivot about the mounting rod 286 and the short rod 294 as a center. Since the conveyor belt unit 130 is free to move vertically with respect to the opening-closing frame member 16 and also in the conveying direction, the shaft 182 can pivot about the mounting rod 286 and the short rod 294 as a center.

It is further noted that as shown in FIG. 3, a charge-eliminating brush 304 is also disposed in the opening-closing frame 16. It contacts or approaches the endless belt 204 above the shaft 182. This charge-eliminating brush 304 may be substantially the same as the charge-eliminating brush 128 disposed in the document carrying-in passage 12. The charge-eliminating brush 304 extends in the width direction and removes electrostatic charges produced on the endless belt 204.

Drive Unit

With reference to FIGS. 6 and 12, a drive unit shown generally at 306 is provided in the rear portion of the inside of the opening-closing frame member 16 (rearwardly of the conveyor belt unit 130) (in FIG. 5, the drive unit 306 is covered with a cover plate 308). As shown clearly in FIG. 12, the drive unit 306 includes a supporting frame 310 to be mounted on the inside surface of the upper surface wall of the opening-closing frame member 16 so that it is freely adjustable in position in the conveying direction. The supporting frame 310 has a first supporting member 312 and a second supporting member 314. The first supporting member 312 comprises a bottom wall 316, a supporting leg wall 318 extending upwardly from the front edge of the bottom wall 316, a linking flange wall 320 extending forwardly from the upper edge of the supporting leg wall 318, and a connecting wall 322 extending slightly upwardly from the rear edge of the bottom wall 316. The second supporting member 314 comprises a supporting leg wall 324 extending opposite to the supporting leg wall 318, a linking flange wall 326 extending rearwardly from the upper edge of the supporting leg wall 324, a supporting side wall 328 extending from one side edge of the supporting leg wall 324 and an additional supporting wall 330 extending in a direction perpendicular to the supporting side wall 328 from the front edge of the supporting side wall 328. The first supporting member 312 and the second supporting member 314 are connected to each other by a suitable means (not shown) such as a linking screw. Two holes 332 of a relatively large diameter spaced from each other in the conveying direction are formed in each of the linking flange wall 320 of the first supporting member 312 and the linking flange wall 326 of the second supporting member 324. A position adjusting member 338 having a movable piece 334 at one end and a guide piece 336 at the other is fixed to the inside surface of the supporting leg wall 318 of the first supporting member 312 by a suitable means (not shown), for example by welding or screwing. A screw hole 340 is formed in the movable piece 334, and a hole 342 is formed in the guide piece 336. The central axis of the screw hole 340 and the central axis of the hole 342 are in alignment with each other and extend in the conveying direction. In correspondence to the holes 332 formed in the linking flange walls 320 and 326, four screw holes 346 are formed in a supporting base plate 344 to be fixed by a suitable method to the inside surface of the opening-closing frame member 16. A stationary piece 350 is fixed to the supporting base plate 344 by a setscrew 348. A hole 352 is formed in the stationary piece 350. The manner of mounting the supporting frame 310 to the supporting base plate 344 is described below. The linking flange walls 320 and 326 of the supporting flame 310 are set opposite to the supporting base plate 344. The set screw 354 is inserted through the holes 332 formed in the linking flange walls 320 and 326, and screwed into the screw hole 346 formed in the supporting base plate 344. Conveniently, rubber rings 356 for vibration absorption are provided on the upper and under surfaces of the linking flange walls 320 and 326. By so doing, the stationary piece 350 fixed to the supporting base plate 344 is positioned adjacent to the guide piece 336 of the supporting frame 310, and the hole 352 of the stationary piece 350 is kept in alignment with the hole 342 of the guide piece 336 and the screw hole 340 of the movable piece 334. Then, an adjusting screw 358 is inserted into the hole 352 of the stationary piece 350 and the hole 342 of the guide piece 336, and screwed into the screw hole 340 of the movable piece 334. A spring washer 360 is interposed between the head portion of the adjusting screw 358 and the stationary piece 350. If at this time the set screw 354 is fitted into the screw hole 346 relatively loosely, the supporting frame 310 can move freely in the conveying direction over some range because the inside diameters of the holes 332 of the linking flange walls 320 and 326 are set at values slightly larger than the shaft diameter of the set screw 354. Accordingly, if the degree of screwing of the adjusting screw 358 with respect to the screw hole 340 of the movable piece 334 is varied, the positions in the conveying direction of the guide piece 336 and the movable piece 334 with respect to the stationary piece 350 are varied. It is possible therefore to adjust the position of the supporting frame 310 with respect to the supporting base plate 344 in the conveying direction by adjusting the degree of screwing of the adjusting screw 358, and then to fix the supporting frame 310 firmly in the adjusted position by firmly screwing the set screw 354 into the screw hole 346 (the adjustment of the position of the supporting frame 310 in the conveying direction will be described further hereinafter).

Again, with reference to FIG. 12, the drive source 290 is mounted on the supporting frame 310. The case for the drive source 290 is fixed to the outside surface of the supporting side wall 328 of the second supporting member 314, and the output shaft 362 of the drive source 290 extends through the supporting side wall 328. A worm gear 364 is fixed to the output shaft 362. As shown in FIG. 6, a detection circular plate 366 of a known form is also fixed to the output shaft 362. In relation to the detection circular plate 366, an optical detector 368 of a known form is mounted on the supporting base plate 344 (FIG. 12 does not show the detection circular plate 366 and the detector 368 for the convenience of depiction). A plurality of circumferentially spaced openings are formed in the detection circular plate 366. The detector 368 has a light-emitting element and a light-receiving element which are disposed on both sides of the detection circular plate 366, and, by detecting the openings of the detection circular plate 366, can determine the amount of rotation of the detection circular plate and therefore the amount of rotation of the output shaft 362 of the drive source 290. With reference to FIGS. 12 and 6, a shaft 370 is rotatably mounted between the supporting leg wall 318 of the first supporting member 312 and the supporting leg wall 324 of the second supporting member 314, and a rotating member 374 is mounted on the shaft 370 via a one-way clutch 372. The rotating member 374 has formed as an integral unit a worm gear 376 at one end portion and a gear 378 at the other end portion. The worm gear 376 is in mesh with the worm gear 364. The one-way clutch 372 does not transmit the rotation of the rotating member 374 to the shaft 370 when the drive source 290 is rotated in the normal direction to rotate the rotating member 374 counterclockwise as viewed from ahead, but does so when the drive source 290 is reversely rotated to rotate the rotating member 374 clockwise as viewed from ahead. The shaft 370 has further mounted thereon a spring clutch 380 and a toothed pulley 382. The spring clutch 380 is controlled by a control solenoid 384 (FIG. 6), and couples the rotating member 374 to the shaft 370 when the solenoid 384 is energized. The toothed pulley 382 is fixed to the shaft 370 and is rotated as a unit with the shaft 370. A shaft 386 is rotatably mounted across the supporting leg wall 318 of the first supporting member 312 and the supporting additional wall 330 of the second supporting member 314 in the supporting frame 310. A gear 390 is mounted on the shaft 386 via a one-way clutch 388. The gear 390 is in mesh with the gear 378 formed in the other end of the rotating member 374. The one-way clutch 388 transmits the rotation of the rotating member 374 and the gear 390 to the shaft 386 when the drive source 290 is normally rotated to rotate the rotating member 374 counterclockwise as viewed from ahead and the gear 390 clockwise as viewed from ahead. But when the drive source 290 is reversely rotated to rotate the rotating member 374 clockwise as viewed from ahead and the gear 390 counterclockwise as viewed from ahead, the one-way clutch 388 does not transmit the rotation of the gear 390 to the shaft 386. A toothed pulley 392 is further fixed to the shaft 386.

As stated hereinabove, the input gear 292 fixed to the shaft 182 in the conveyor belt unit 130 is in mesh with the drive gear 288 fixed to the mounting rod 286. A toothed pulley 393 is formed integrally in the drive gear 288. An endless timing belt 394 is wrapped about the toothed pulley 393 and the toothed pulley 382 fixed to the shaft 370. Furthermore, an input gear 396 is fixed to the rear end portion of the upper rotating shaft 120 in the document carrying-in means 118, and is in mesh with the drive gear 288. Accordingly, when the drive source 290 is normally rotated and the solenoid 384 is energized, the rotation of the drive source 290 is transmitted to the shaft 182 of the conveyor belt unit 130 and the upper rotating shaft 120 of the document carrying-in means 118 via a drive mechanism including the timing belt 394. As a result, the conveyor belt unit 130 is driven in the normal direction (in the direction in which a sheet-like document is conveyed downstream on the transparent plate 8), and the document carrying-in means 118 is driven in the normal direction (in the direction in which a sheet-like document is introduced onto the transparent plate 8). When the drive source 290 is reversely rotated, its rotation is transmitted to the shaft 182 of the conveyor belt unit 130 and the upper rotating shaft 120 of the document carrying-in means 118 via the drive mechanism including the timing belt 394. As a result, the conveyor belt unit 130 is driven in the reverse direction (the direction in which the sheet-like document is conveyed upstream on the transparent plate 8), and the document carrying means 118 is driven in the reverse direction.

With reference to FIGS. 6 and 12 again, the upper rotating shaft 58 of the separation roller mechanism 48 disposed in relation to the document table 32 extends rearwardly through the supporting side plate 52. A toothed pulley 398 is mounted rotatably on the rear end portion of the upper rotating shaft 58, and a spring clutch 400 is also mounted on it. The spring clutch 400 is controlled by a control solenoid 402 (FIG. 6), and when energized, couples the toothed pulley 398 to the upper rotating shaft 58. An endless timing belt 404 is wrapped about the toothed pulley 398 and the toothed pulley 392 fixed to the shaft 386. Hence, when the drive source 290 is normally rotated and the solenoid 402 is energized, the rotation of the drive source 290 is transmitted to the upper rotating shaft 58 of the separation roller mechanism 48 via the drive mechanism including the timing belt 404 to rotate the upper rotating shaft 58 and the feed roller 60 fixed to it clockwise as viewed from ahead. When the upper rotating shaft 58 is so rotated, the lower rotating shaft 62 of the separation roller mechanism 48 and the reversely rotating roller 64 fixed to it are rotated clockwise as viewed from ahead, as already described hereinabove with reference to FIGS. 3 to 5. Furthermore, as already stated, during one rotation of the upper rotating shaft 58 clockwise as viewed from ahead, the sending roller 92 temporarily descends and is rotated clockwise as viewed from ahead. Moreover, as will be described further below, the solenoid 402 is energized only for some period of time in order to rotate the upper rotating shaft 58 and the lower rotating shaft 62 through one turn. When the drive source 290 is inversely rotated, the one-way clutch 388 does not transmit the rotation of the drive source 290 to the shaft 386, and therefore, the timing belt 404 is not driven.

For the drive mechanism including the timing belt 394 and 404 to function properly, it is critical that the timing belts 394 and 404 should be maintained taut under a proper tension. In the illustrated embodiment improved by the invention, the supporting frame 310 on which the toothed pulleys 382 and 392 are mounted is adjustable in position in the conveying direction. Accordingly, by operating the adjusting screw 358 and properly adjusting the position of the supporting frame 310, the tension of the timing belts 394 and 404 can be set at the required value. Thus, the stretched state of the timing belts 394 and 404 can be maintained under the required state without the need for any additional devices such as a belt tension adjusting idler pulley heretofore used.

Document Placing Restriction Member

With reference to FIG. 13 in conjunction with FIGS. 3 and 4, a document placing restriction member 406 is also disposed on the upper surface of the housing 6 of the electrostatic copying machine 2 adjacent to the downstream end (the left end in FIG. 3) of the transparent plate 8. As FIG. 13 shows, a subsiding area 408 is formed on the upper wall of the housing 6 adjacent the downstream end of the transparent plate 8, and the document placing restriction member 406 is disposed in the subsiding area 408. Short rods 410 projecting forwardly and rearwardly at the downstream end portion are provided on both sides in the width direction of the document placing restriction member 406. The short rods 410 are pivotally supported on holding members (not shown) disposed on the upper wall of the housing 6 in the front and rear sides of the subsiding area 408. As a result, the document placing restriction member 406 is mounted so that it is free to pivot about the short rods 410 as a center between an elevated position shown in FIG. 13 and a lowered position shown in FIG. 3. The upstream end of the document placing restriction member 406 is in proximity to, or in contact with, the downstream end of the transparent plate 8. As shown in FIG. 13, a spring means 412, which may be a helical spring, or a plate spring is disposed between the document placing restriction member 406 and the subsiding area 408 in the upper wall of the housing 6. The spring means 412 elastically biases the document placing restriction member 406 counterclockwise as viewed from ahead, and elastically holds it at the elevated position. At the elevated position, projecting pieces 414, formed on both sides in the width direction of the document placing restriction member 406, make contact with predetermined sites of the holding member (not shown). Furthermore, in the elevated position, the upstream end of the restriction member 406 projects slightly upwardly beyond the upper surface of the transparent plate 8. When the opening-closing frame member 16 is opened and a sheet-like document is placed on the transparent plate 8 by hand, the sheet-like document can be placed at a predetermined position in the left-right direction in FIG. 13 by contacting its front edge with the upstream end of the restriction member 406. Suitable symbols showing the placing positions of sheet-like documents of standard sizes (for example, B5, A4 and B4 according to JIS) in the width direction may be marked in the upstream end portion of the upper surface of the document placing restriction member 406.

As shown in FIG. 5, a supporting plate 416, which may be metallic, is fixed to the downstream end portion of the opening-closing frame member 16. The supporting plate 416 extends in the width direction, and suspending pieces 418, constituting a forced lowering means, are formed on both end portions in the width direction of the under surface of the supporting plate 416. As can be seen from FIG. 3, when the opening-closing frame member 16 is held at the closing position, the suspending pieces 418 come into contact with the upper surface of the restriction member 406, and pivot the restriction member 406 clockwise in FIG. 3 against the elastic biasing action of the spring means 412 and hold it at the lowered position. At the lowered position, the upstream end of the restriction member 406 is positioned downwardly of the upper surface of the transparent plate 8. Hence, the document placing restriction member 406 does not obstruct the carrying of the sheet-like document delivered downstream from the upper surface of the transparent plate 8 by the action of the conveyor belt unit 130. As shown clearly in FIGS. 4 and 13, a stepped portion 420 being lowered on its downstream side is formed on the upper surface of the restriction member 406. As will be described in detail hereinbelow, in the illustrated embodiment, the automatic document conveying device 4 of the reversible type having a document reversing function and a simple automatic document conveying device having no document reversing function can be selectively mounted on the housing 6. The stepped portion 420 formed on the upper surface of the document placing restriction member 406 is useful when the simple automatic document conveying device is mounted. As will be described in detail hereinafter, when the simple automatic document conveying device is mounted, a sheet-like document delivered from the surface of the transparent plate 8 is deflected upwardly from the site of the stepped portion 420.

Document Carrying-out Passage, Document Reversing Passage, Document Discharging-Reversing Means, and Discharging-Reversing Control Member It will be seen by reference to FIGS. 1 and 3 that a document discharge opening 422 extending in the width direction on the upstanding wall portion is formed in the opening-closing frame member 16 in relation to one end (the left end in FIG. 3) of the depressed main portion 36 on the upper surface of the opening-closing frame member 16. The space above and left of the opening 422 is defined by a cover member 424 formed separately from the opening-closing frame member 16. As shown in FIGS. 3 and 16, suspending linking pieces 425 are formed in the front and rear ends respectively of one end of the cover member 424 which defines the upper edge of the discharge opening 422, and these suspending linking pieces 425 are mounted pivotally on the opening-closing frame member 16 by a supporting pin 426. Thus, the cover member 424 is mounted so that it is free to pivot between a closed position, shown by the solid line in FIG. 3, and an open position, shown by the two-dot chain line in FIG. 3, about the supporting pin 426 as a center. The cover member 424 has an upper wall portion 428 extending from the site of the document discharge opening 422 and a suspending wall portion 430 suspending from the tip of the upper wall portion 428. As clearly shown in FIGS. 3, 5, and 16, two permanent magnets 432, spaced from each other in the width direction, are fixed to the lower end portion of the inside surface of the suspending wall portion 430. A metallic supporting plate 433 is disposed in the downstream end portion of the opening-closing frame member 16, and has a bottom wall portion 434 extending along the upper surface of the housing 6 and an upstanding wall portion 436 extending upwardly from one end of the bottom wall portion 434 (see FIG. 15). When the cover member 424 is brought to the closed position, the permanent magnets 432 magnetically adhere to the outside surface of the upstanding wall portion 436 of the supporting plate 433, and, consequently, the cover member 424 is held at the closed position.

Figure 14:
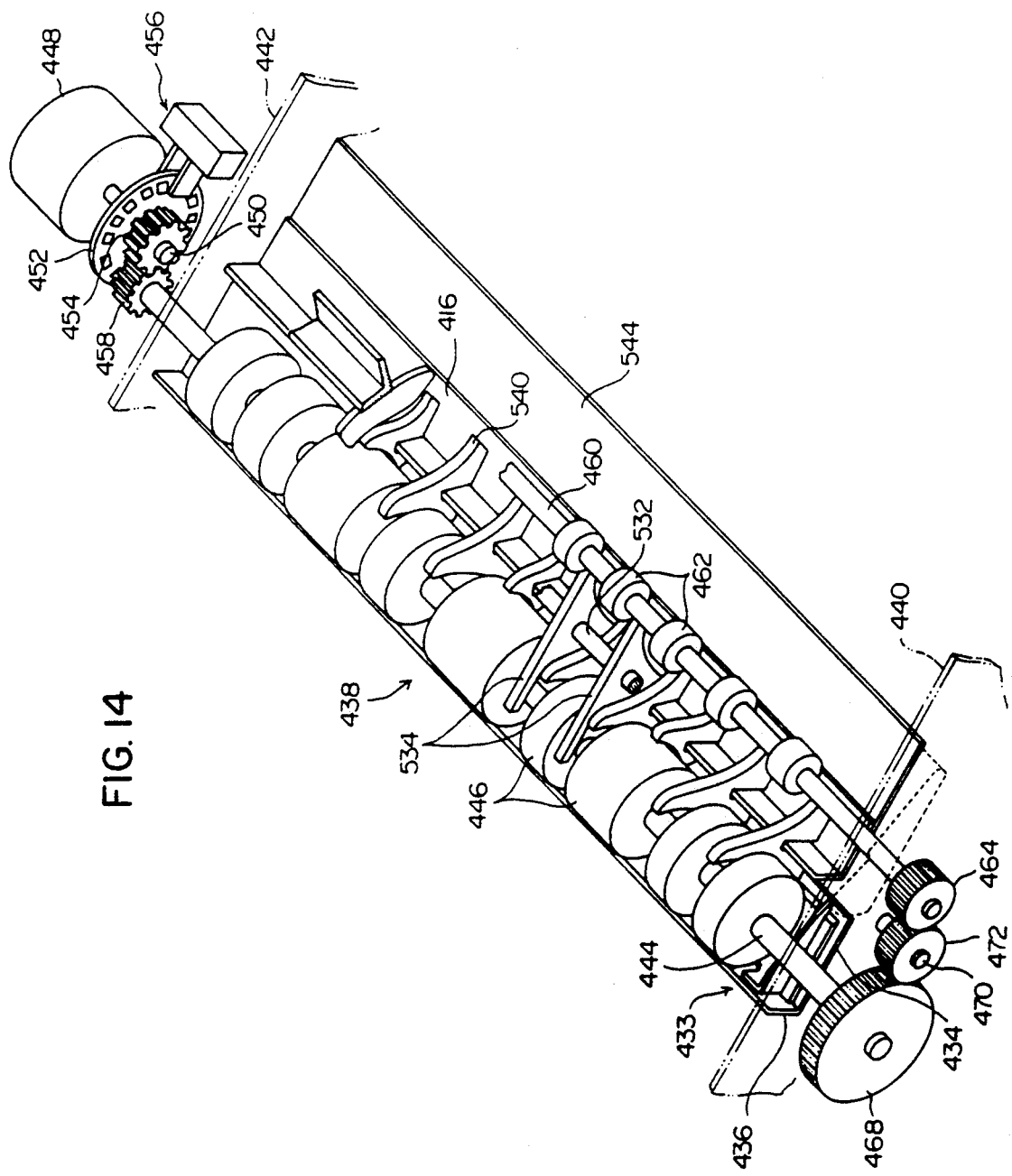
FIG. 14 is a partial perspective view showing the document discharging-reversing means used in the conveyor belt unit of FIG. 7 and its related structure.

With reference to FIGS. 3 and 14, a conveyor roller mechanism 438 constituting the document discharging-reversing means is disposed in the downstream end of the opening-closing frame member 16 (therefore, that portion which is covered with the cover member 424). More specifically, as shown in FIG. 14, supporting side plates 440 and 442, located on both sides in the width direction of the supporting plate 433, are provided in the downstream end portion of the opening-closing frame member 16. A rotating shaft 444 to be driven is rotatably mounted across the supporting side plates 440 and 442. A plurality of (in FIG. 14) axially spaced rollers 446 to be driven are fixed to the rotating shaft 444. Conveniently, the driven rollers 446 are made of synthetic rubber. A drive source 448, which may be an electric motor, is disposed rearwardly of the supporting side plate 442. The output shaft 450 of the drive source 448 extends forwardly, and a detection circular plate 452 and a gear 454 are fixed to the output shaft 450. A plurality of circumferentially spaced openings are formed in the detection circular plate 452 which is of the known type. In relation to the detection circular plate 452, an optical detector 456 is provided. The detector 456 has a light-emitting element and a light-receiving element disposed on opposite sides of the detection circular plate 452 and detects the amount of rotation of the detection circular plate 452, and therefore the amount of rotation of the output shaft 450 of the drive source 448. The rotating shaft 444 extends rearwardly through the supporting side plate 442, and an input gear 458 is fixed to the rear end portion of the rotating shaft 444. The gear 458 is in mesh with the gear 454, and consequently, the rotating shaft 444 is drivingly coupled to the drive source 448. A rotating shaft 460 is also rotatably mounted across the supporting side plates 440 and 442. A plurality of axially spaced discharge rollers 462 are fixed to the rotating shaft 460 (for example, there are 10 discharge rollers 462, and half of them are shown in FIG. 14). The rotating shaft 460 extends forwardly through the supporting side plate 440, and a gear 464 is fixed to the front end portion of the rotating shaft 460. On the other hand, the rotating shaft 444 also extends forwardly through the supporting side plate 440, and a gear 468 is fixed to the front end portion of the rotating shaft 444. Furthermore, a forwardly projecting short rod 470 is fixed to the supporting side plate 440, and a gear 472 is rotatably mounted on the short rod 470. The gear 472 is in mesh with both the gear 464 and the gear 468. Thus, the rotating shaft 460, to which the discharge rollers 462 are fixed, is drivingly coupled to the drive source 448 via the rotating shaft 444 to which the rollers 446 are fixed.

Figure 15:
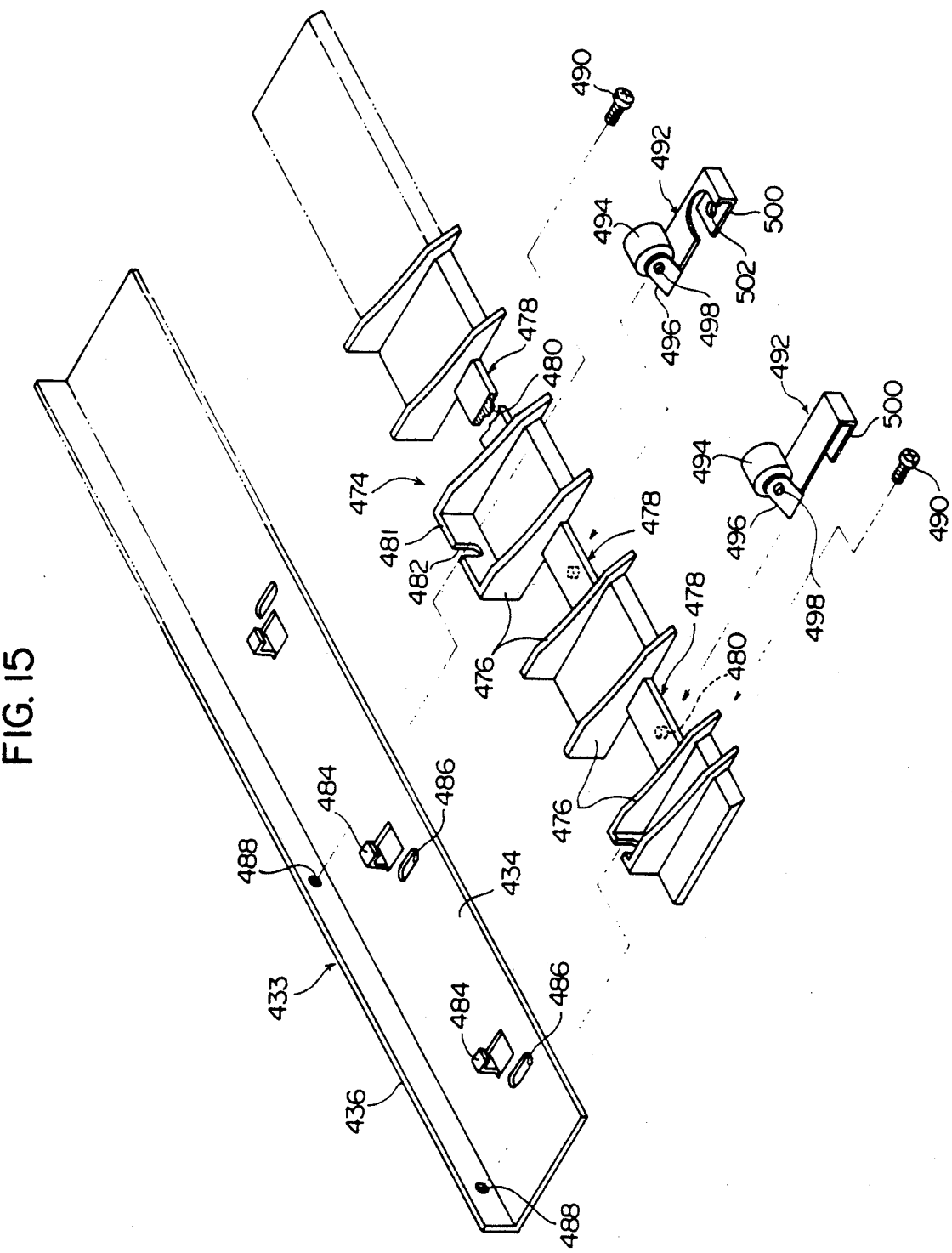
FIG. 15 is an exploded perspective view showing part of the document discharging-reversing means of FIG. 14.
Figure 16:
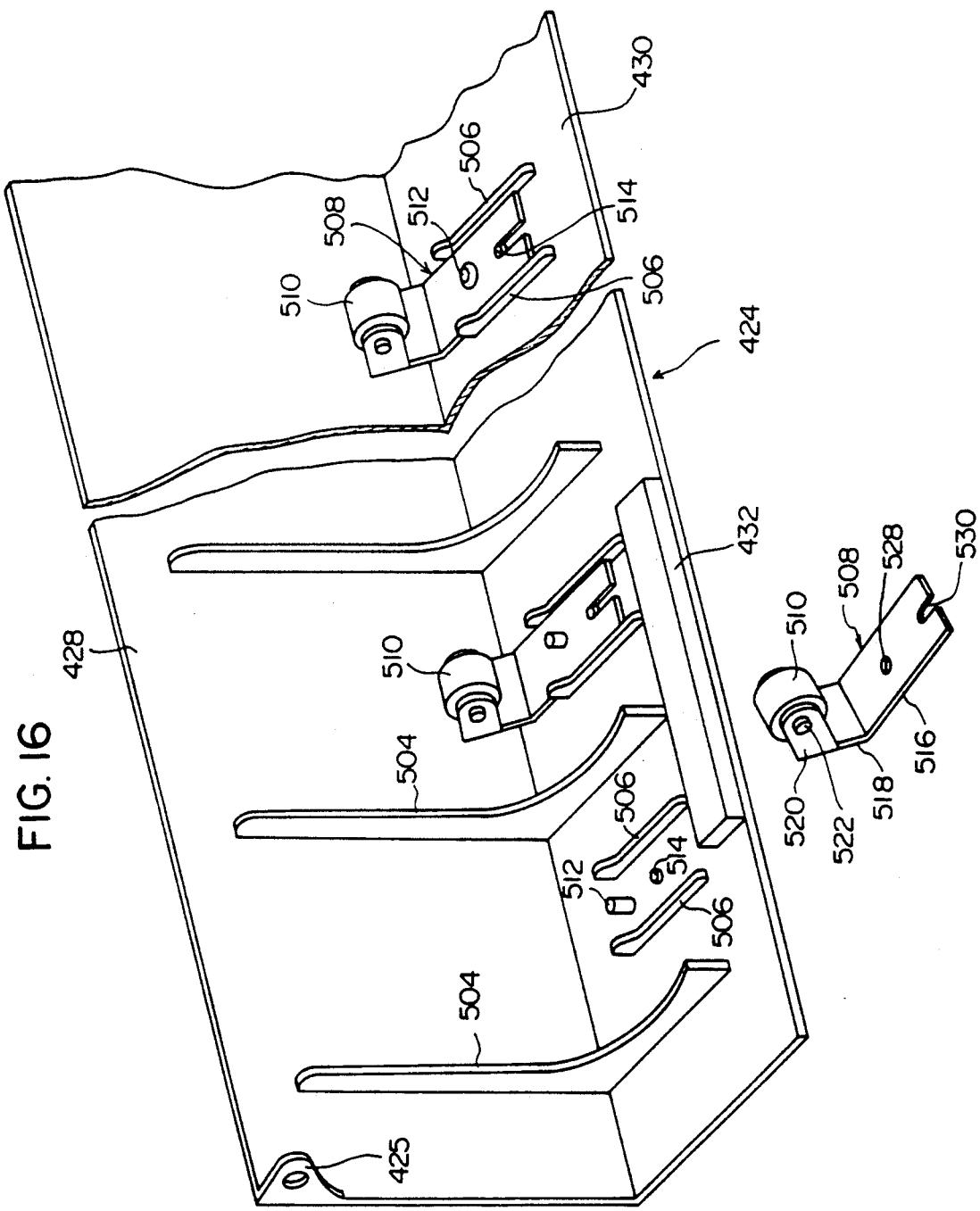
FIG. 16 is a perspective view showing part of the document discharging-reversing means of FIG. 14 in a partly exploded state.

With reference to FIG. 15 in conjunction with FIGS. 3 and 14, a guide member 474, which may be formed from a synthetic resin, is disposed on the supporting plate 433. As clearly shown in FIG. 15, a plurality of upstanding guide ribs 476, spaced properly in the width direction, are formed in the guide member 474. The upper ends of the guide ribs 476 are progressively elevated downstream (in the left direction in FIG. 3). A widthwise slender engaging portion 478 is formed between adjacent guide ribs 476. A downwardly projecting cylindrical protrusion 480 (which will be described further hereinafter) is formed in the under surface of the engaging portion 478. A widthwise connecting wall 481 is formed between the downstream ends of specific adjoining guide ribs 476, and an upwardly open notch 482 is formed in the intermediate portion of the connecting wall 481. In correspondence to the engaging portions 478 of the guide member 474, engaging pieces 484 projecting upwardly and then upstream are formed on the bottom wall portion 434 of the supporting plate 433. Openings 486 are formed adjacent to these engaging pieces 484 for receiving the protrusions 480 of the guide member 474. Furthermore, a screw hole 488 is formed in the upstanding wall portion 436 of the supporting plate 433 in correspondence to the notch 482 of the guide member 474. The guide member 474 is positioned on the supporting plate 433 and the engaging portions 478 of the guide member 474 are brought into engagement with the engaging pieces 484 of the supporting plate 433. Then, a setscrew 490 is screwed into the screw hole 488 of the supporting plate 433 through the notch 482 of the guide member 474. The guide member 474 is thus fixed onto the supporting plate 433. The protrusions 480 formed in the under surfaces of the engaging portions 478 of the guide member 474 are positioned in the openings 486 of the supporting plate 433.

As can be seen from FIG. 15, prior to fixing the guide member 474 to the supporting plate 433, follower rollers 494 are mounted respectively via supporting members 492 on the engaging portions 478 of the guide member 474. In other words, the engaging portions 478 of the guide member 474 constitute securing portions for the follower rollers 494. Supporting pieces 496, upstanding from both sides in the width direction of the supporting member 492, which may be formed of a spring steel plate, are formed at one end of the supporting member 492, and follower roller 494 is rotatably mounted on a shaft 498 between the supporting pieces 496. The other end portion 500 of the supporting member 492 is bent in the shape of a channel, and is put elastically over the engaging portion 478 of the guide member 474 from its upstream end. Thus, the supporting member 492 is mounted on the engaging portion 478 of the guide member 474. A hole 502 is formed in the other end portion 500 of the supporting member 492, and the protrusion 480 formed in the under surface of each engaging portion 478 of the guide member is inserted into the hole 502. As a result, the supporting member 492 is properly positioned with respect to the engaging portion 478 of the guide member 474, and the supporting member 492 is accurately prevented from being detached accidentally from the engaging portion 478 of the guide member 474. As can be seen from FIG. 3, the follower rollers 494 are elastically pressed against the driven rollers 446 by the elastic biasing action of the supporting member 492 formed of a spring steel plate.

With reference to FIGS. 3 and 16, a plurality of widthwise spaced guide ribs 504 are formed on the inside surface of the cover member 424. Each of the guide ribs 504 extends over both the inside surface of the upper wall portion 428 and the inside surface of the suspending wall portion 430 of the cover member 424. Furthermore, a pair of protruding strips 506 spaced widthwise from each other are formed in the areas between adjoining guide ribs 504 in the inside surface of the suspending wall portion 430 of the cover member 424, and a follower roller 510 is mounted between the protruding strips 506 via a supporting member 508. In other words, the area between the adjoining guide ribs 504 in the suspending wall portion 430 of the cover member 424 constitutes a securing portion for the follower roller 510. As shown in the left portion of FIG. 16, a relatively large cylindrical protrusion 512 and a relatively small cylindrical protrusion 514 are formed between the pair of protruding strips 506 in the inside surface of the suspending wall portion 430. On the other hand, the supporting member 508, formed of a spring steel plate, has a fixed portion 516 and a supporting portion 518 which are bent with respect to each other. The supporting portion 518 has formed therein supporting pieces 520, upstanding from both sides in the width direction, and a follower roller 510 is rotatably mounted on a shaft 522 between these supporting pieces 520. A hole 528 and a notch 530 opened to the free end are formed in the fixed portion 516. As shown centrally in FIG. 16, the protrusions 512 formed in the inside surface of the suspending wall portion 430 of the cover member 424 are inserted through the holes 528 formed in the fixed portions 516 of the supporting members 508, and the protrusions 514 formed in the inside surface of the suspending wall portion 430 are positioned in the notch 530 formed in the fixed portions 516. Thereafter, as shown in the right portion of FIG. 16, the tip portions of the protrusions 512 inserted through the holes 528 are heated and pressed out of shape by a suitable tool. As a result, the supporting members 508 are fixed in position, and the follower rollers 510 are mounted as is required. It is understood by reference to FIG. 3 that the follower rollers 510, which can be formed of a synthetic resin or a synthetic rubber, are elastically pressed against the rollers 446 by the elastic biasing action of the supporting members 508 formed from a spring steel plate.

With reference to FIGS. 3 and 14, a supporting shaft 532 is rotatably mounted across the supporting side plates 440 and 442 disposed in the downstream end portion of the opening-closing frame member 16. A plurality of axially spaced discharging-reversing control members 534 are fixed to the supporting shaft 532 (FIG. 14 shows only two discharging-reversing control member 534). The output shaft of a control solenoid 536 (FIG. 3) is linked to the supporting shaft 532 via a suitable linking mechanism (not shown). When the solenoid 536 is de-energized, the discharging-reversing control member 534 is held at a discharging position shown by the solid line in FIG. 3. When the solenoid 536 is energized, the discharging-reversing control member 534 is held at a reversing position shown by the two-dot chain line in FIG. 3. As clearly shown in FIG. 14, the supporting plate 416, extending in the width direction, exists below the supporting shaft 532. A plurality of widthwise spaced guide ribs 540 are arranged on the supporting plate 416. As will be stated hereinbelow, the guide ribs 540 and the discharging-reversing member 534 act cooperatively to define a document reversing passage 542. A guide plate 544 extending upstream from the upstream end of the supporting plate 416 is also fixed to the supporting plate 416. The free end of the guide plate 544, which may be formed of a synthetic resin film (for example, one available under the tradename "Lumilar"), is in contact with, or in proximity to, the surface of the downstream end portion of the operative travelling section of the endless belt 204 in the conveyor belt unit 130, as shown in FIG. 3. A reversed document detector 546 is annexed to the document reversing passage 542. The detector 546 has a detection arm projecting into the document reversing passage 542, and detects a sheet-like document moving through the document reversing passage 542. Furthermore, a discharged document detector 548 is also disposed for detecting a sheet-like document moving to the document discharge opening 422 past the upper edge of the discharging-reversing control member 534 when the discharging-reversing control member 534 is held at the discharging position.

When the solenoid 536 is de-energized and the discharging-reversing control member 534 is held at the discharging position, a sheet-like document which is delivered from the transparent plate 8 past the document placing restriction member 406 by the action of the conveyor belt unit 130 rotating in a normal direction is conveyed through a document carrying-out passage 550 defined between the driven rollers 446 rotating clockwise in FIG. 3 and the follower rollers 494 and 510, cooperating with the driven rollers 446, by the conveying action of these rollers 446, 494 and 510. Further, the sheet-like document advances past the upper edge of the discharging-reversing control member 534 held at the discharging position, and is further conveyed by the action of the discharge rollers 462 and discharged onto the upper surface of the depressed main portion 36 of the opening-closing frame member 16 through the document discharge opening 422. On the other hand, when the solenoid 536 is energized and the discharging-reversing control member 534 is held at the reversing position, a sheet-like document conveyed through the document carrying-out passage 550 by the cooperative action of the driven rollers 446 and the follower rollers 494 and 510 is not conducted to the upper edge of the discharging-reversing control member 534, but is introduced into the document reversing passage 542 defined between the discharging-reversing control member 534 held at the reversing position and the guide ribs 540 disposed below the control member 534. The introduced document is passed through the document reversing passage 542 and again introduced onto the transparent plate 8. When the re-carrying-in of the document is performed, the document is reversed or turned over. When the sheet-like document is carried-in onto the transparent plate 8 from the document reversing passage 542, it is accurately conducted to the transparent plate 8 by the guiding action of the guide plate 544 without colliding with the downstream edge of the transparent plate 8. As will be described further hereinbelow, when the sheet-like document is re-introduced onto the transparent plate 8, the endless belt 204 of the conveyor belt unit 130 is inversely driven, and the sheet-like document introduced onto the transparent plate 8 is conveyed upstream to a predetermined position on the transparent plate 8 by the action of the conveyor belt unit 130.

Simple Automatic Document Conveying Device

Figure 17:
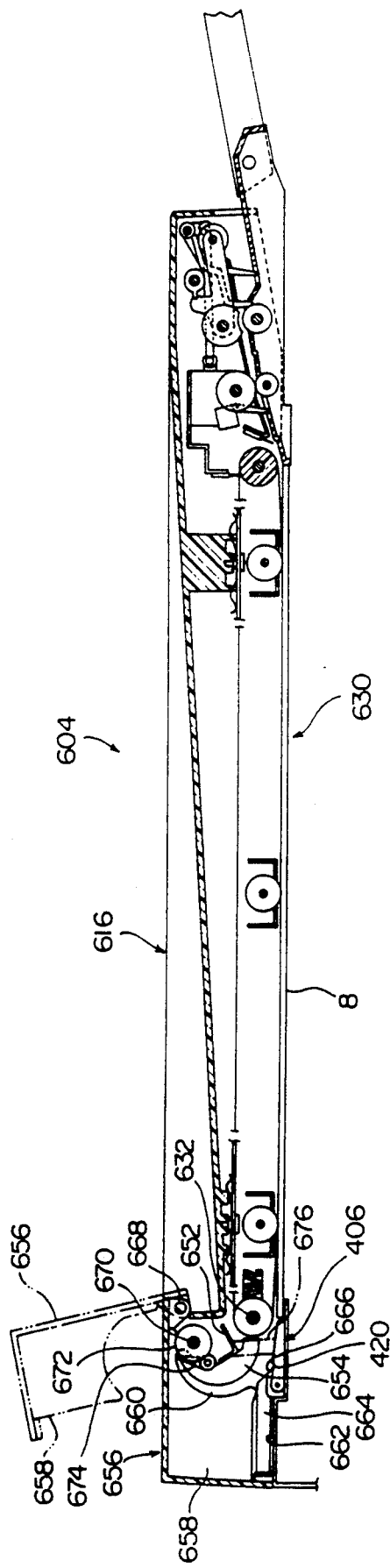
FIG. 17 is a sectional view of an automatic document conveying device having no document reversing function which can be mounted on the electrostatic copying machine in the embodiment of FIG. 1 in place of the one having the document reversing function.

FIG. 17 shows another automatic document conveying device 604 which can be mounted on the housing 6 of the electrostatic copying machine 2 in place of the automatic document conveying device 4 described hereinabove. As required, the automatic document conveying device 4 has the document reversing function by which the sheet-like document delivered from the transparent plate 8 is not discharged but is reintroduced onto the transparent plate 8 after turning the document over. The automatic document conveying device 604 shown in FIG. 17 is of a simple type having no such document reversing function.

The automatic document conveying device 604 has an opening-closing frame member 616, which may be substantially the same as the opening-closing frame member 16 in the automatic document conveying device 4. A supporting member 652 having an L-shaped cross-section is fixed to the inside of the downstream end portion of the opening-closing frame member 616. A plurality of widthwise spaced guide ribs 654 are arranged on the supporting member 652 which extends widthwise. In correspondence to these guide ribs 654, a plurality of widthwise spaced guide ribs 658 are formed on the inside surface of a pivotable cover member 656 of the opening-closing frame member 616. The guide ribs 654 and the guide ribs 658 define a document carrying-out passage 660 therebetween. A widthwise extending supporting plate 662 (which may be substantially the same as the supporting plate 433 in the automatic document conveying device 4) is also disposed in the downstream end portion of the opening-closing frame member 616. A plurality of widthwise spaced supporting ribs 664 are arranged on the supporting plate 662. The right end of each of the supporting ribs 664 is inclined downwardly to the right, and to the right ends of the ribs 664 is fixed a document deflecting member 666 extending widthwise. The document deflecting member 666 protrudes downwardly from the right end of the supporting ribs 664. The document deflecting member 666 is formed of a flexible plastic film (such as one sold under the tradename "Lumilar"). A rotating shaft 670, extending widthwise in proximity to a document discharge opening 668, is rotatably mounted on the downstream end portion of the opening-closing frame member 616. A plurality of widthwise spaced discharge rollers 672 are fixed to the rotating shaft 670. The rotating shaft 670 is drivingly coupled to a follower shaft 632 in a conveyor belt unit 630 via a suitable power transmission means (not shown) such as a drive belt mechanism, and is driven incident to the driving of the conveyor belt unit 630. Furthermore, a discharged document detector 674 is also disposed for detecting a sheet-like document discharged through the document carrying-out passage 660.

Again, with reference to FIG. 17, a forced lowering means comprised of suspending pieces 676, extending downwardly from both side portions of the supporting plate 652 in the width direction, is disposed as in the case of the automatic document conveying device 4. When the opening-closing frame member 616 is held at the closed position shown in FIG. 17, the forced lowering means act on the document placing restriction member 406 provided on the housing 6 to lower the restriction member 406 to the lowered position shown in FIG. 17 from the elevated position shown in FIG. 13. In this state, the free end portion of the document deflecting member 666 is positioned at the stepped portion 420 formed in the upper surface of the restriction member 406, as clearly shown in FIG. 17. Accordingly, when the automatic document conveying device 604 shown in FIG. 17 is mounted on the housing 6, a sheet-like document delivered downwardly from the transparent plate 8 does not go past the document placing restriction member 406, but is deflected upwardly from the stepped portion 420 of the restriction member 406 by the action of the document deflecting member 666 and is conducted to the space 660 between the guide ribs 654 and the guide ribs 658.

As shown in FIG. 3, in the automatic document conveying device 4 having the document reversing function, the conveyor roller mechanism 438, constituting the document discharging-reversing means, is disposed downstream of the transparent plate 8. The sheet-like document delivered from the transparent plate 8 has to be deflected upwardly after it is moved to the left side of the conveyor roller mechanism 438. Accordingly, the sheet-like document which has been conveyed downstream a relatively long distance from the downstream end of the transparent plate 8 must be deflected upwardly. Therefore, in the automatic document conveying device 4 having the document reversing function, the document is deflected upwardly by the action of the guide ribs 476 after it has been conveyed completely past the document placing restriction member 406. In contrast, in the simple automatic document conveying device 604 shown in FIG. 17, the length of the document carrying-out passage 660 should desirably be shortened as much as possible. It is desired therefore to deflect the sheet-like document upwardly at a position in proximity to the transparent plate 8. Accordingly, in the simple automatic document conveying device 604 shown in FIG. 17, the sheet-like document delivered from the transparent plate 8 does not completely pass the document placing restriction member 406, but is deflected upwardly from the stepped portion 420 provided on the upper surface of the document placing restriction member 406 by the action of the document deflecting member 666.

The rest of the structure of the simple automatic document conveying device 604 shown in FIG. 17 is substantially the same as the structure of the automatic document conveying device 4, and therefore its detailed description will be omitted in this specification.

Control of Operations

Figure 18:
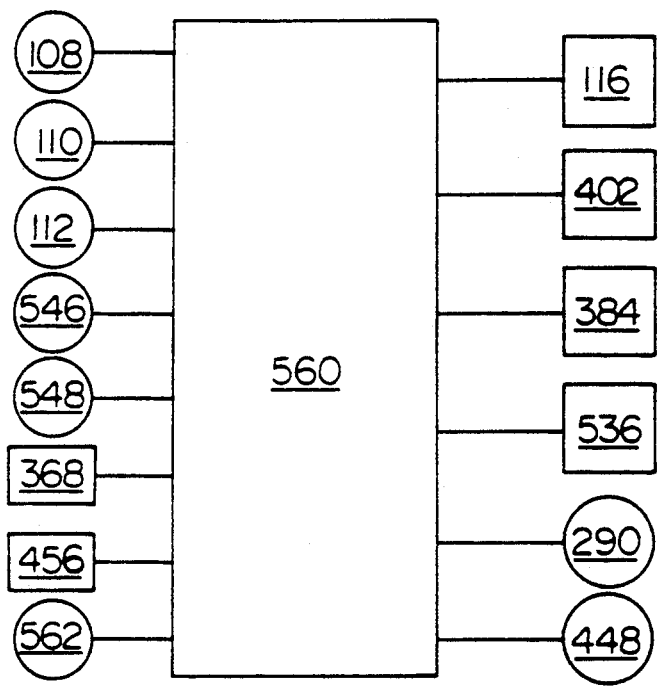
FIG. 18 is a simplified view showing elements relating to controlling the embodiment of FIG. 1.

The operations of the automatic document conveying device 4 having the document reversing function described hereinabove may be controlled, for example, as described below by an operation control means 560 which may be a microprocessor (FIG. 18).

I. Simple (non-reversing) mode

Figure 19:
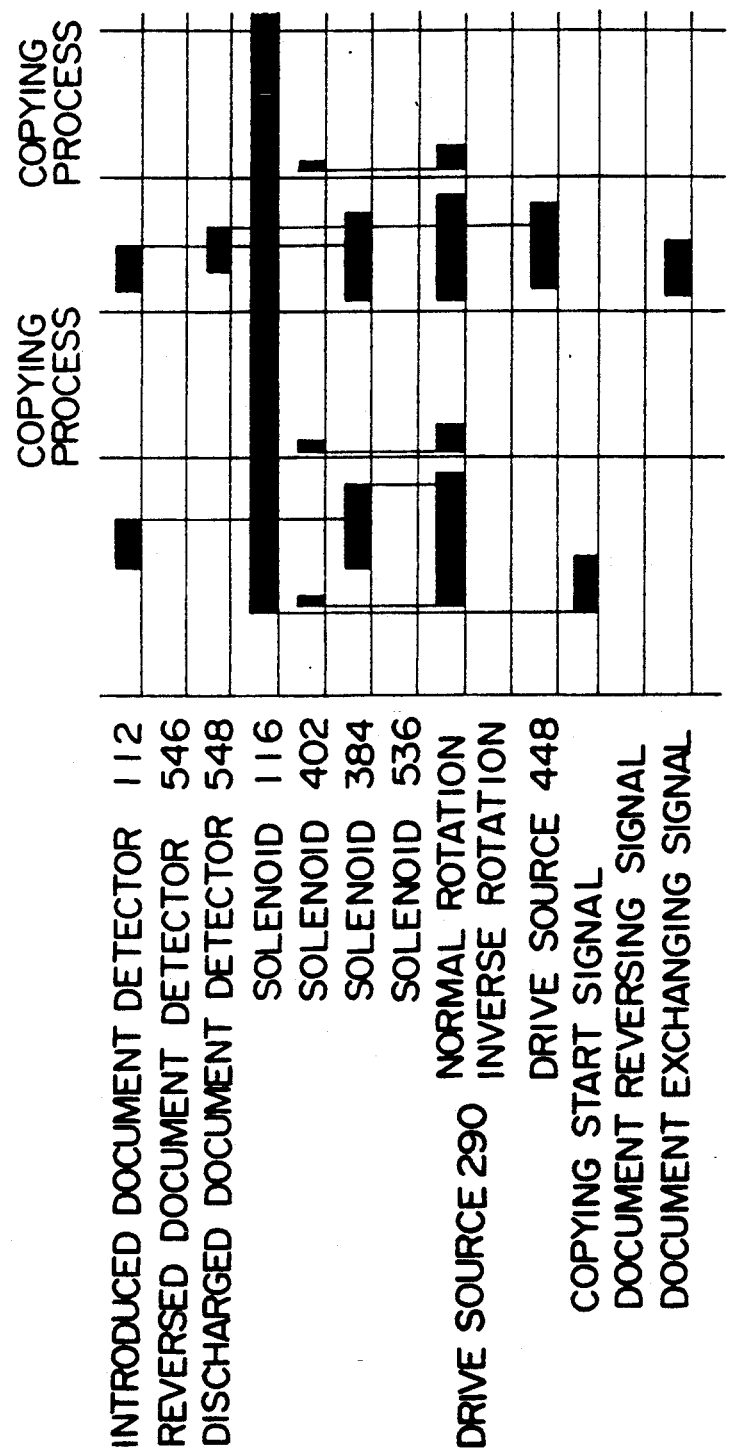
FIG. 19 is a timing chart showing the operating procedure in a simple (non-reversing) mode of the automatic document conveying device in the embodiment of FIG. 1.

First, a simple (non-reversing) mode in which the image on only one surface of a sheet-like document is to be copied will be described mainly with reference to FIGS. 3 and 19. A plurality of sheet-like documents whose images on only one surface are to be copied are placed on the document table 32 in the stacked state with their one surface facing downwards. The front edges of the documents are kept in proximity to, or in contact with, the suspending legs of the document delivery hampering member 114 held at the hampering position shown in FIG. 3. When the documents are placed in position on the document table 32, the placed document detector 108 detects them. When thereafter, a copying start switch 562 (FIG. 4), arranged in the operating panel 14 of the electrostatic copying machine 2, is depressed, a copying start signal is fed into the operation control means 560. As a result, the self-holding type solenoid 116 (hampering member control means) is energized to bring the document delivery hampering member 114 to the receded position and permit delivery of the sheet-like documents. Then, after the lapse of a predetermined period of time (for example, 200 ms), the normal rotation of the drive source (electric motor) 290 is started (FIG. 6). At the same time the solenoid 402 (FIG. 6) is energized for a predetermined period time (for example 200 ms). As a result, the spring clutch 400 (FIG. 6) is coupled for a period corresponding to one rotation of the clutch 400, and the sending roller 92 is temporarily lowered and rotated through one turn in the delivery direction. Furthermore, the feed roller 60 of the separation roller mechanism 48 is rotated through one turn in the feed direction, and the reversely rotating roller 64 is rotated through one turn in a direction opposite to the feeding direction. Thus, the uppermost sheet-like document on the document table 32 is separated from the other documents and delivered to the document carrying-in passage 42, and the front edge of the document comes into contact with the nipping site of the document carrying-in means 118 (the rollers 122 and 126). Then, after the lapse of a predetermined period of time (for example, 540 ms), the solenoid 384 (FIG. 6) is energized. As a result, the driving of the document carrying-in means 118 in the normal direction is started, and the driving of the conveyor belt unit (document conveying means) 130 in the normal direction is started. Consequently, the sheet-like document is introduced onto the transparent plate 8 through the document carrying-in passage 42. At this time, whether or not the width of the sheet-like document is above a predetermined value is determined by whether or not the introduced document detector 110 (FIG. 5) detects the sheet-like document. The size of the sheet-like document in the conveying direction is detected by the time during which the detector 112 is detecting the sheet-like document. When the drive source 290 is rotated in the normal direction by a predetermined amount (the amount of normal rotation of the drive source 290 is detected by the optical detector 368) from the time when the introduced document detector 112 began to detect the sheet-like document (in other words, the time when the detector 112 detected the front edge of the sheet-like document), the solenoid 384 is de-energized, and thus the normal driving of the document carrying-in means 118 and the normal driving of the conveyor belt unit 130 are stopped. At this time, the sheet-like document is held at a required position on the transparent plate 8, more specifically at a position at which its front edge is in alignment with, or in proximity with, the downstream end of the transparent plate 8. Then, after the lapse of a predetermined period of time (for example, 200 ms), the driving source 290 is de-energized. Then, a copying process is performed in the electrostatic copying machine 2. The copying process includes optical scanning of the sheet-like document positioned on the transparent plate 8.

When a predetermined period of time (for example, 200 ms) has elapsed from the time when the drive source 290 was de-energized, the normal rotation of the drive source 290 is started, and simultaneously, the solenoid 402 (FIG. 6) is energized for a predetermined period of time (for example, 200 ms). As a result, as in the above-described case, the sending roller 92 is temporarily lowered and rotated through one turn in the sending direction. Furthermore, the feed roller 60 of the separation roller mechanism 48 is rotated through one turn in the feeding direction, and the inversely rotating roller 64 is rotated through one turn in a direction opposite to the feeding direction. As a result, the next sheet-like document on the document table 32 is separated from the other documents and delivered to the document carrying-in passage 42, and its front edge comes into contact with the nipping site of the document carrying-in means 118 which is out of action. The drive source 290 is de-energized after a predetermined period (for example, 650 ms) has elapsed from the time when the normal rotation of the drive source 290 was started.

When the copying process for the first sheet-like document is over, a document replacing signal is produced at a suitable time thereafter. As a result, the normal rotation of the drive source 290 is started, and the solenoid 384 (FIG. 6) is energized. Accordingly, the normal driving of the document carrying-in means 118 is started, and the normal driving of the conveyor belt unit 130 is started. Thus, the second sheet-like document which has already been delivered to the document carrying-in passage 42 begins to be introduced toward the transparent plate 8. At this time, as in the above-described case, whether or not the width of the sheet-like document is above a predetermined value is determined by whether the introduced document detector 110 (FIG. 5) detects the sheet-like document or not, and the size of the sheet-like document is detected by the time during which the detector 112 is detecting the sheet-like document. When the normal driving of the conveyor belt unit 130 is started as above, the carrying-in of the second sheet-like document is started. At the same time, the first sheet-like document positioned on the transparent plate 8 begins to be delivered from the transparent plate 8. When a predetermined period of time (for example, 170 ms) has passed from the time when the replacement start signal was produced, the normal rotation of the drive source (electric motor) 448 (FIG. 14) for the conveyor roller mechanism 438, constituting the document discharging-reversing means, is started. As a result, the sheet-like document delivered to the document carrying-out passage from the transparent plate 8 is conveyed through the document carrying-out passage 550 and discharged from the document discharge opening 422. The discharged document detector 548 detects the sheet-like document discharged through the document carrying-out passage 550. When the drive source 290 has been rotated in the normal direction by a predetermined amount from the time when the introduced document detector 112 began to detect the sheet-like document, the solenoid 384 is de-energized, and the normal driving of the document carrying-in means 118 and the normal driving of the conveyor belt unit 130 are stopped. At this time, the second sheet-like document is held at a required position on the transparent plate 8. Then, after the lapse of a predetermined period of time (for example, 200 ms), the drive source 290 is de-energized. Furthermore, when the drive source 448 is rotated in the normal direction by a predetermined amount (the normal rotation of the driving source 448 is detected by the optical detector 456) measured from the time when the discharged document detector 548 terminated the detection of the sheet-like document (in other words, the time when the detector 548 detected the rear edge of the sheet-like document), the drive source 448 (FIG. 14) is also de-energized. Thereafter, a copying process for the second sheet-like document newly introduced onto the transparent plate 8 is performed in the electrostatic copying machine 2. The above carrying-in and operations are repeated with respect to all the sheet-like documents placed on the document table 32, and the placed document detector 108 no longer detects the sheet-like document, the solenoid 116 (hampering member control means) is de-energized, and the document hampering member 114 is returned to the hampering position.

II. Reversing Mode

Figure 20:
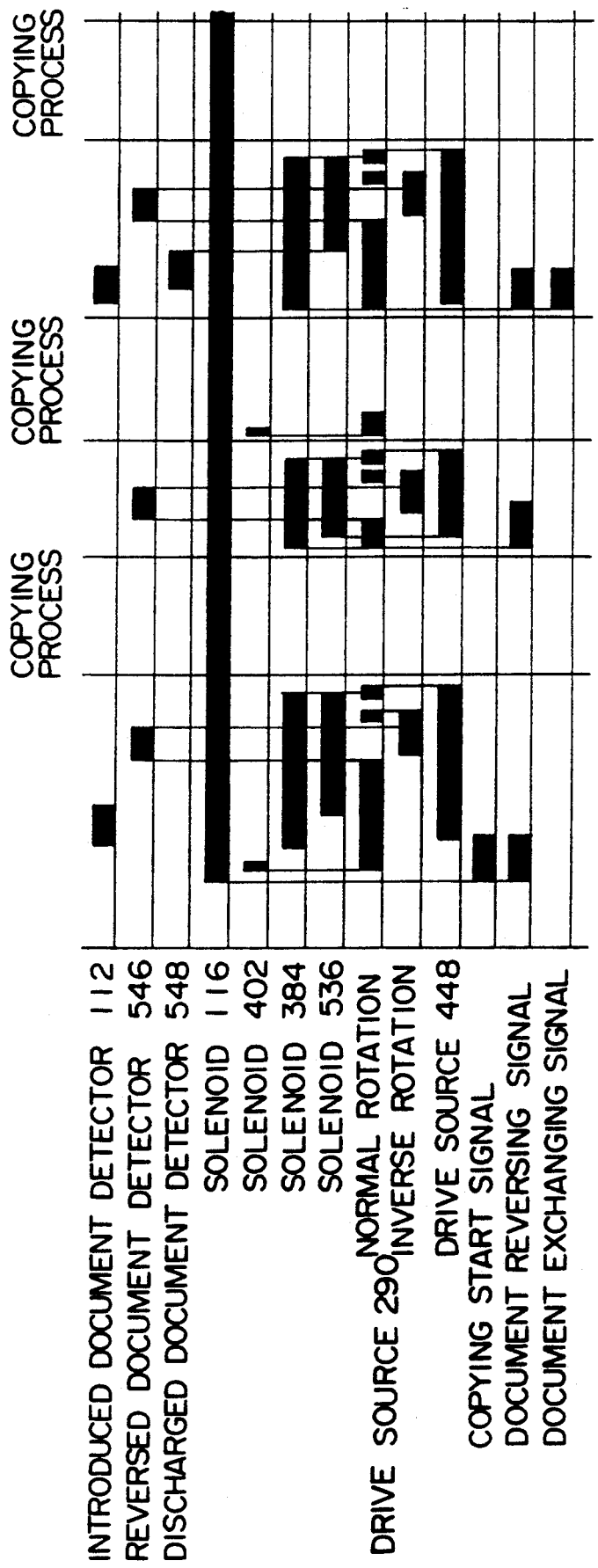
FIG. 20 is a timing chart showing the operating procedure in a reversing mode of the automatic document conveying device in the embodiment of FIG. 1.

The reversing mode, in which images on both surfaces of sheet-like documents are to be copied, will be described mainly with reference to FIGS. 3 and 20.

A plurality of sheet-like documents are placed in the stacked state on the document table 32. The front edges of the documents are kept in proximity to, or in contact with, the suspending legs of the document delivery hampering member 114. When the sheet-like documents are placed in position on the document table 32, the placed document detector 108 detects them, and the reversing mode is set (manually by operating a required switch or key disposed on the operating panel 14 of the electrostatic copying machine 2), an operation start signal and a reversing signal are fed to the operation control means 560 upon depressing the copying start switch 562 (FIG. 4) of the electrostatic copying machine 2. As a result, the self-holding type solenoid 116

(hampering member control means) is energized to bring the document delivery hampering member 114 to the retracted position and permit delivery of the sheet-like documents. Then, after the lapse of a predetermined period of time (for example 200 ms), the normal rotation of the drive source (electric motor) 290 is started, and simultaneously, the solenoid 402 (FIG. 6) is energized for a predetermined period of time (for example, 200 ms). As a result, the spring clutch 400 (FIG. 6) is coupled for a period of time corresponding to one rotation of the clutch 400. Consequently, the sending roller 92 is temporarily lowered and rotated through one turn in the feeding direction. Furthermore, the feed roller 60 of the separation roller mechanism 48 is rotated through one turn in the feeding direction, and the inversely rotating roller 64 is rotated through one turn in the direction opposite to the feeding direction. Thus, the uppermost sheet-like document in the stack on the document table 32 is separated from the other documents and delivered to the document carrying-in passage 42, and its front edge comes into contact with the nipping site of the document carrying-in means 118 (the rollers 122 and 126) which is out of action. Then, after the lapse of a predetermined period of time (for example, 540 ms), the solenoid 384 (FIG. 6) is energized. As a result, the driving of the document carrying-in means 118 in the normal direction is started, and the driving of the conveyor belt unit (document conveying means) 130 in the normal direction is started. Consequently, the sheet-like document is introduced onto the transparent plate 8 through the document carrying-in passage 142. At this time, whether or not the width of the sheet-like document is above a predetermined value is determined by whether or not the introduced document detector 110 (FIG. 5) detects the sheet-like document. The size of the sheet-like document in the conveying direction is detected by the time during which the introduced document detector 112 is detecting the sheet-like document. When a predetermined period of time (for example 170 ms) has elapsed from the time when the solenoid 384 (FIG. 6) was energized and the carrying-in of the sheet-like document was started, the normal rotation of the drive source 448 (FIG. 14) for the conveyor roller mechanism 438, constituting the document discharging-reversing means, is also started. Furthermore, after a predetermined period of time (for example, 530 ms) has elapsed from the time when the driving source 448 was energized, the solenoid 536 is energized, and the discharging-reversing control member 534 (FIG. 14) is switched from the discharging position to the reversing position. Even when the sheet-like document has been conveyed to the required position on the transparent plate 8, the solenoid 384 continues to be energized, and therefore, by the action of the conveyor belt unit 130, the sheet-like document continued to be conveyed on the transparent plate 8 and is sent to the document carrying-out passage 550 from the transparent plate 8. The document further continues to be conveyed by the conveyor roller mechanism 438, and is introduced into the document reversing passage 542 by the action of the discharging-reversing control member 534 held at the reversing position. Thus, the document is conveyed toward the downstream end of the transparent plate 8 through the document reversing passage 542. When as described above the sheet-like document is conveyed through the document reversing passage 542, the reversed document detector 546 detects this sheet-like document. When the reversed document detector 546 begins to detect the sheet-like document (or in other words, when the detector 546 detects the front edge of the sheet-like document), the normal rotation of the drive source 290 (FIG. 6) is stopped. After the lapse of some delay time (for example, 100 ms), the reverse rotation of the drive source 290 is started. Thus, the conveyor belt unit 130 (and the document carrying-in means 118) begins to be driven in the reverse direction. As a result, the sheet-like document, introduced onto the transparent plate 8 from its downstream end through the document reversing passage 542, is conveyed upstream (in the right direction in FIG. 3) on the transparent plate 8 by the action of the conveyor belt unit 130 which is being driven in the reverse direction. When the drive source 290 has been reversely rotated by a predetermined amount (the amount of the reverse rotation of the drive source 290 is also detected by the optical detector 368) from the time when the reversed document detector 542 terminated the detection of the sheet-like document 9 (or, in other words, when the detector 542 detected the rear edge of the sheet-like document), a braking action is produced in the drive source 290 (electric motor) by, for example, grounding both the reverse rotating current path and the normally rotating current path of the drive source 290, and by this action, the reverse driving of the conveyor belt unit 130 (and the document carrying-in means 118) is rapidly stopped. At this point of time, the sheet-like document introduced onto the transparent plate 8 from its downstream side has gone slightly past the required position at which its left end is in alignment with, or in proximity to, the downstream end (left end) of the transparent plate 8, and is positioned slightly to the right of that position. Since the sheet-like document so positioned on the transparent plate 8 has once been conveyed through the document reversing passage 542 from the document carrying-out passage 550, its surface is reversed as compared with its condition on the document table 32. When a predetermined period of time (for example, 200 ms) has passed from the time when the braking action was applied to the drive source 290, the drive source 290 is stopped. After the lapse of a predetermined further period of time (for example, 200 ms), the rotation of the drive source 290 is resumed. After the lapse of some delay time (for example 30 ms) from that, the solenoid 384 is de-energized. During this delay time, the sheet-like document is slightly conveyed to the left by the normal rotation of the conveyor belt unit 130 and thus is held at the required position on the transparent plate 8. Simultaneously with the de-energization of the solenoid 384, the solenoid 536 is also de-energized, and the discharging-reversing control member 534 is returned to the discharging position. When a predetermined period of time (for example, 170 ms) has further elapsed from this time, the normal rotation of the drive source 290 and the normal rotation of the drive source 448 are stopped.

Figure 21:
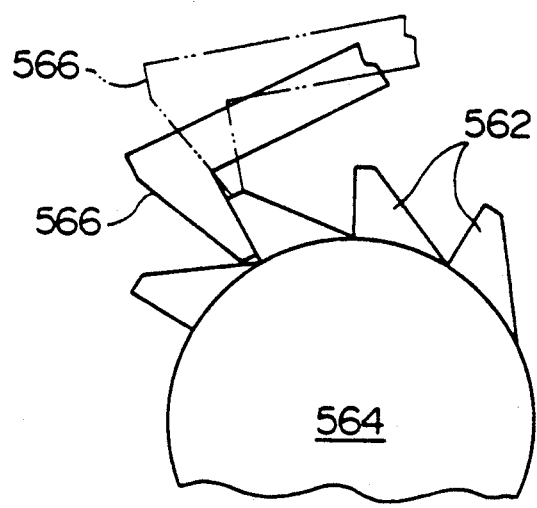
FIG. 21 is a simplified partial view showing part of a spring clutch used in the automatic document conveying device of FIG. 7.

With regard to the above resumption of the normal rotation of the drive source 290 for a short time (for example, 200 ms), the following fact should be noted. As shown in FIG. 21, the spring clutch 380, to be controlled by the solenoid 384, has a ratchet 564 having a plurality of pawls 562 on its peripheral surface. When the solenoid 384 is de-energized, an engaging lever 566 is held by the pawls 562, as shown by the solid line. However, if the solenoid 384 is de-energized without resuming the rotation of the drive source 290, the engaging lever 566 is likely to make contact with the tip surface of one of the pawls 562, as shown by the two-dot chain line in FIG. 21, without being properly held by the pawls 562, although this possibility is small. If this happens, however, the starting of the normal rotation of the drive source 290, in the manner to be described, causes the ratchet 564 to rotate to some degree until the engaging lever 566 is properly held by the pawls 562, in spite of the fact that the solenoid 384 is not energized. As a result, the conveyor belt unit 130 (and the document carrying-in means 118) are normally rotated to some degree, and therefore, the sheet-like document to be held at the required position on the transparent plate 8 is slightly deviated downstream from the required position. In the illustrated embodiment, the solenoid 384 is de-energized after resuming the driving of the drive source 290. Accordingly, the engaging lever 566 is accurately held by the pawls 562, and the above problem is unlikely to arise.

Thereafter, a copying process is performed in the electrostatic copying machine 2, and a copied image of the back surface of the sheet-like document positioned on the transparent plate 8 is formed. This back surface corresponds to that surface of the document which faced upward when it was placed on the document table 32.

When the copying process is over, a reversing signal is produced. As a result, the normal rotation of the drive source 290 (FIG 6) is started, and the solenoid 384 is energized. Hence, the normal rotation of the conveyor belt unit 130 (and the document carrying-in means 118) is started, and the sheet-like document on the transparent plate 8 begins to be delivered to the document carrying-out passage 550. When a predetermined period of time (for example, 170 ms) has passed from the time when the reversing signal was produced, the normal rotation of the drive source 448 (FIG. 14) is also started, and the solenoid 536 is energized to hold the discharging-reversing control member 534 at the reversing position. Accordingly, the sheet-like document, delivered to the document carrying-out passage 550 from the transparent plate 8, continues to be conveyed by the conveyor roller mechanism 438 and is introduced into the document reversing passage 542 from the document carrying-out passage 550, by the discharging-reversing control member 534 held at the reversing position, and is conveyed toward the downstream end of the transparent plate 8. When the reversed document detector 546 detects the front edge of the sheet-like document introduced into the document reversing passage 542, the normal driving of the drive source 290 is stopped. After some delayed time (for example, 100 ms), the reverse rotation of the drive source 290 is started. As a result, the conveyor belt unit 130 (and the document carrying-in means 118) begins to be driven in the reverse direction, and the sheet-like document introduced onto the transparent plate 8 from its downstream end through the document reversing passage 542 is conveyed upstream (in the right direction in FIG. 3) on the transparent plate 8 by the action of the conveyor belt unit 130 driven in the reverse direction. When the drive source 290 has been reversely rotated by a predetermined amount measured from the time when the reversed document detector 546 detected the rear edge of the sheet-like document, a braking action was produced in the drive source 290 (which is an electric motor) whereby the reverse driving of the conveyor belt unit 130 (and the document carrying-in means 118) is rapidly stopped. At this point of time, the sheet-like document introduced onto the transparent plate 8 from its downstream end has slightly gone past the required position on the transparent plate 8, more specifically at a position at which the left end of the document is in alignment with, or in proximity to, the downstream end (left end) of the transparent plate, and is positioned slightly to the right of the required position. Since the sheet-like document re-positioned on the transparent plate 8 has once been conveyed through the document reversing passage 542 from the document carrying-out passage 550, its surface is again reversed (therefore, it is in the same condition as it was on the document table 32). When a predetermined period of time (for example, 200 ms) has passed from the time when the braking action was produced on the drive source 290, the drive source 290 gets out of action. After a predetermined period of time (for example 20 ms) further, the normal rotation of the drive source 290 is resumed. Then, after the lapse of some delay time (for example, 30 ms) from then, the solenoid 384 is de-energized. During this delay time, the sheet-like document is conveyed slightly to the left by the normal rotation of the conveyor belt unit 130 and is held at the required position on the transparent plate 8. Simultaneously with the de-energization of the solenoid 384, the solenoid 536 is de-energized, and the discharging-reversing control member 534 is returned to the discharging position. When a predetermined period of time (for example, 170 ms) has further passed from then, the normal rotation of the drive source 290 and the normal rotation of the drive source 290 and the normal rotation of the drive source 448 are stopped.

Thereafter, a copying process is performed in the electrostatic copying machine 2, and a copied image is formed on the surface of the sheet-like document positioned on the transparent plate 8 (that surface which faced downwardly when it was on the document table 32). Thus, copying of both surfaces of the first sheet-like document is terminated.

On the other hand, when the copying process for the surface of the first sheet-like document is started as above, simultaneously with it or after the lapse of some time, the normal rotation of the drive source 290 is started and the solenoid 402 (FIG. 6) is energized for a predetermined period of time (for example, 200 ms). As a result, the spring clutch 400 (FIG. 6) is coupled for a period corresponding to one rotation of the clutch 400, and the sending roller 92 is temporarily lowered and rotated in the sending direction. Furthermore, the feed roller 60 of the separation roller mechanism 48 is rotated through one turn in the feeding direction, and the inversely rotating roller 64 is rotated through one turn in the direction opposite to the feeding direction. Accordingly, the next sheet-like document is separated from the other documents on the document table 32 and delivered to the document carrying passage 42, and its front edge comes into contact with the nipping site of the document carrying-in means 118 which is out of action. The drive source 290 is stopped after a predetermined period of time (for example, 650 ms) has elapsed from the time when its normal rotation began.

One may wish to deliver the next sheet-like document when the copying process for the back surface of the first sheet-like document is being performed (that is, during the first copying process for the first sheet-like document). This, however, will give rise to the following problem. In the illustrated embodiment, because of the need to reduce the cost of production, for example, the conveyor belt unit 130 and the document carrying-in means 118 are connected to the same drive source 290 via the same clutch 380. Accordingly, when after copying of the back surface of the first sheet-like document, the solenoid 384 is energized to couple the clutch 380, and the drive source 290 is normally driven and then reversely driven, both the conveyor belt unit 130 and the document carrying-in means 118 are normally driven and then reversely driven. Hence, if the next sheet-like document has been conveyed to the document carrying-in means 118 at this time, the above normal and reverse rotation of the document carrying-in means 118 adversely affect the next sheet-like document. This problem can be avoided if the delivery of the next sheet-like document is delayed until the copying process for the front surface of the first sheet-like document (that is, the second copying process for the first sheet-like document). Starting of the next copying process is not delayed by delaying the delivery of the next sheet-like document till the copying of the front surface of the previous sheet-like document.

When the copying process for the front surface of the first sheet-like document is over, a replacing signal and a reversing signal are produced. As a result, the normal rotation of the drive source 290 is started, and the solenoid 384 is energized. Hence, the normal driving of the conveyor belt unit 130 and the document carrying-in means 118 is started. The first sheet-like document on the transparent plate 8 is delivered to the document carrying-out passage 550, and the second sheet-like document delivered to the document carrying-in passage 42 is introduced onto the transparent plate 8. After the lapse of a predetermined period of time (for example, 170 ms) from the time when reversing signal and the replacing signal were produced, the normal rotation of the drive source 448 is also started. Thus, the first sheet-like document sent to the document carrying-out passage 550 is not introduced into the document reversing passage 542, but continues to be conveyed along the upper edge of the discharging-reversing control member 534 held at the discharging position and is discharged through the document discharge opening 422. When the discharged document detector 548 detects the rear edge of the first sheet-like document, the solenoid 536 is energized, and the discharging-reversing control member 534 is held at the reversing position. The second sheet-like document introduced onto the transparent plate 8 further continues to be conveyed, and is delivered to the document carrying-out passage 550 from the transparent plate 8 and then is introduced into the document reversing passage 542 from the document carrying-out passage 550 by the discharging-reversing control member 534 held at the reversing position. When the reversed document detector 546 detects the front edge of the second sheet-like document, the normal rotation of the drive source 290 is stopped. After some delay time (for example 100 ms), the reverse rotation of the drive source 290 is started. Thus, the conveyor belt unit 130 (and the document carrying-in means 118) begin to be driven in the reversely rotating direction, and the second sheet-like document introduced onto the transparent plate 8 from its downstream end through the document reversing passage 542 is conveyed upstream (in the right direction in FIG. 3) over the transparent plate 8 by the action of the conveyor belt unit 130 driven in the reverse direction. When the drive source 290 has been reversely rotated by a predetermined amount measured from the time when the reversed document detector 546 detected the rear edge of the sheet-like document, a braking action is produced in the drive source 290 (which is an electric motor) to rapidly stop the reverse driving of the conveyor belt unit 130 (and the document carrying-in means 118). At this time, the second sheet-like document introduced onto the transparent plate 8 from its downstream end has slightly gone past the required position on the transparent plate 8, more specifically, a position at which its left end is in alignment with, or in proximity to, the downstream end (left end) of the transparent plate 8, and is positioned slightly to the right of that required position. Since the second sheet-like document so positioned on the transparent plate 8 has once been conveyed through the document reversing passage from the document carrying-out passage 550, it is turned over (the surface is reversed). When a predetermined period of time (for example, 200 ms) has elapsed from the time when the braking action was produced in the drive source 290, the drive source 290 gets out of action. After the lapse of a predetermined period of time (for example, 200 ms) further, the normal rotation of the drive source 290 is resumed. After the lapse of some delay time (for example, 30 ms), the solenoid 384 is de-energized. During this delay time, the sheet-like document is conveyed slightly leftward and is brought to the above-mentioned required position on the transparent plate 8. Simultaneously with the de-energization of the solenoid 384, the solenoid 536 is also de-energized, and the discharging-reversing control member 534 is returned to the discharging position. When a predetermined period of time (for example 170 ms) has further elapsed from then, the normal rotation of the drive source 290 and the drive source 448 is stopped.

Thereafter, a copying process is carried out in the electrostatic copying machine 2, and a copied image of the back surface of the second sheet-like document is produced. The above carrying-in and carrying-out are repeatedly performed on all the sheet-like documents placed on the document table 32. When all the sheet-like documents on the document table 32 are sent out and the placed document detector 198 no longer detects the sheet-like document, the solenoid 116 (hampering member control means) is de-energized, and the document hampering member 114 is returned to the hampering position.

The operation control of the simple automatic document conveying device 604 shown in FIG. 17 is nearly the same as that of the simple (non-reversing) mode of the automatic document conveying device 4 having the document reversing function (however, that the simple automatic document conveying device 604 does not include the drive source 448 and the solenoid 536, and no controlling of these elements is necessary). Accordingly, a detailed description of the operation control of the device 604 is omitted herein.

While the present invention has been described in detail hereinabove with reference to the preferred embodiments of the automatic document conveying device and the electrostatic copying machine equipped with the document conveying device which are shown in the accompanying drawings, it should be understood that the invention should not be limited to these specific embodiments, but various changes and modifications are possible without departing from the scope of the invention described and claimed herein.

What we claim is:

1. An automatic document conveying device for an image-processing machine including a housing having on its upper surface a transparent plate on which to place a document to be processed, said automatic document conveying device comprising:

a first opening-closing frame member adapted to be pivotably mounted on the housing so that said first frame member is free to pivot about a pivot axis extending along the rear edge of the transparent plate between a closed position at which said first frame member covers the transparent plate and an open position at which the transparent plate is exposed to view, said first opening-closing frame member including means operative when said first frame member is at the closed position for carrying in a sheet-like document onto the transparent plate from the upstream end thereof, carrying out a document on the transparent plate from the downstream end thereof, and conveying the document on the transparent plate to a document reversing passage from the downstream end of the transparent plate, turning the document over, and re-introducing the document onto the transparent plate from said downstream end;

a second opening-closing frame member adapted to be pivotably mounted on the housing so that said second frame member is free to pivot about a pivot axis extending along one edge of the transparent plate between a closed position at which said second frame member covers the transparent plate and an open position at which the transparent plate is exposed to view, said second opening-closing frame member including means operative when said second frame member is at the closed position for carrying in a sheet-like document onto the transparent plate from the upstream end thereof, and carrying out a document on the transparent plate from the downstream end thereof;

a document placing restriction member adapted to be disposed on the upper surface of the housing with the restriction member upstream end adjacent the downstream end of the transparent plate so that said restriction member is free to move between an elevated position at which the restriction member upstream end extends above the upper surface of the transparent plate and a lowered position at which said restriction member upstream end is below the upper surface of the transparent plate, said restriction member including spring means, for elastically biasing said restriction member to the elevated position, and a stepped portion formed on the upper surface of the document placing restriction member and having a depressed downstream side;

first forced lowering means on said first opening-closing frame member and adapted to force said document placing restriction member to the lowered position thereof against the elastic biasing action of said spring means when said first opening-closing frame member is at the closed position thereof, to convey a sheet-like document downstream from the downstream end of the transparent plate, over said document placing restriction member, past the stepped portion of said restriction member, and to the document reversing passage for turning over of the document and reintroducing of the document onto the transparent plate or for carrying of the document out of said first frame member; and second forced lowering means on said second opening-closing frame member and adapted to force said document placing restriction member to the lowered position thereof against the elastic biasing action of said spring means when said second opening-closing frame member is at the closed position thereof, and a document deflecting member having a forward end positioned at said restriction member stepped portion when said second opening-closing frame member is at the closed position to cause a sheet-like document moved downstream from the downstream end of the transparent plate to be deflected upwardly from the stepped portion of said restriction member by said document deflecting member and to be carried out of said second frame member.

2. The automatic document conveying device of claim 1, further comprising means for mounting said document placing restriction member so that said restriction member is free to pivot between the elevated position thereof and the lowered position thereof about a pivot axis extending widthwise near the downstream end of said restriction member.

3. The automatic document conveying device of claim 1 in which the document deflecting member is made of a flexible plastic film.

4. The automatic document conveying device of claim 1 in which each of said first and the second forced lowering means is comprised of a pair of contact pieces arranged on both sides of said frame members in the width direction to make contact with the document placing restriction member.

* * * * *